(12) United States Patent
Haruna et al.

(10) Patent No.: US 10,836,003 B2
(45) Date of Patent: Nov. 17, 2020

(54) INSERTION GUIDE AND INSERTION GUIDE DEVICE

(71) Applicant: MITSUBISHI ELECTRIC CORPORATION, Chiyoda-ku (JP)

(72) Inventors: Masaki Haruna, Chiyoda-ku (JP); Kazuhiko Fukushima, Chiyoda-ku (JP); Ieyoung Kim, Chiyoda-ku (JP); Satoru Sofuku, Chiyoda-ku (JP); Toshitaka Nakaoji, Chiyoda-ku (JP); Yasushi Horiuchi, Chiyoda-ku (JP); Yusuke Saruta, Chiyoda-ku (JP); Junji Takaki, Chiyoda-ku (JP); Noboru Kawaguchi, Chiyoda-ku (JP); Yutaka Ezaki, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/075,817

(22) PCT Filed: Dec. 19, 2016

(86) PCT No.: PCT/JP2016/087764
§ 371 (c)(1),
(2) Date: Aug. 6, 2018

(87) PCT Pub. No.: WO2017/138261
PCT Pub. Date: Aug. 17, 2017

(65) Prior Publication Data
US 2019/0047096 A1    Feb. 14, 2019

(30) Foreign Application Priority Data

Feb. 12, 2016   (JP) .................. 2016-024790

(51) Int. Cl.
*B23P 19/02* (2006.01)
*B23P 19/04* (2006.01)
(Continued)

(52) U.S. Cl.
CPC ............... *B23P 19/02* (2013.01); *B23P 19/04* (2013.01); *B23P 19/10* (2013.01); *B23P 19/102* (2013.01);
(Continued)

(58) Field of Classification Search
CPC . B23P 19/02; B23P 19/04; B23P 19/10; B25J 13/08
See application file for complete search history.

(56) References Cited

U.S. PATENT DOCUMENTS 3,155,405 A * 11/1964 Cadovius ............. A47B 47/021
403/13
4,861,132 A * 8/1989 Moulin ................ G02B 6/3843
385/78
(Continued)

FOREIGN PATENT DOCUMENTS

EP    1281884 A2    2/2003
JP    60-161088 A   8/1985
(Continued)

OTHER PUBLICATIONS

International Search Report dated Mar. 21, 2017 in PCT/JP2016/087764 filed Dec. 19, 2016.
(Continued)

*Primary Examiner* — Joseph J Hail
*Assistant Examiner* — J Stephen Taylor
(74) *Attorney, Agent, or Firm* — Oblon, McClellan, Maier & Neustadt, L.L.P.

(57) ABSTRACT

Provided is an insertion guide that performs accurate rotation correction between a shaft and a hole and phase
(Continued)

correction between the shaft and hole. The shaft includes: a first guide portion at a distal end of the shaft having a diameter smaller than a diameter of the hole; a second guide portion, provided on a base end side of a first narrow cylindrical portion, and having a diameter smaller than the diameter of the hole and larger than a diameter of the first narrow cylindrical portion; and a third guide portion, provided at the distal end of the shaft, and is a recessed portion to be engaged with a protruding portion formed in the hole. The shaft being inclined with respect to the hole, is brought into contact with the hole at two points or less before the third guide portion is brought into contact with the protruding portion.

16 Claims, 19 Drawing Sheets

(51) Int. Cl.
  *B23P 19/10* (2006.01)
  *B23P 19/12* (2006.01)
  *B25J 13/08* (2006.01)
  *F16D 1/112* (2006.01)
(52) U.S. Cl.
  CPC ............. *B23P 19/105* (2013.01); *B23P 19/12* (2013.01); *B25J 13/08* (2013.01); *B25J 13/085* (2013.01); *F16D 1/112* (2013.01)

(56) References Cited

U.S. PATENT DOCUMENTS

| | | | | | |
|---|---|---|---|---|---|
| 4,921,396 | A | * | 5/1990 | Asakawa | B23P 19/102 248/550 |
| 4,936,004 | A | * | 6/1990 | Vaughn | B23P 11/02 285/31 |
| 5,619,782 | A | * | 4/1997 | Tanaka | B23P 19/102 29/281.4 |
| 2010/0057256 | A1 | * | 3/2010 | Sato | B23P 19/12 700/258 |
| 2011/0153076 | A1 | | 6/2011 | Noro | |

FOREIGN PATENT DOCUMENTS

| | | |
|---|---|---|
| JP | 2-59226 A | 2/1990 |
| JP | 4-348887 A | 12/1992 |
| JP | H 10076492 A | 3/1998 |
| JP | 11-10455 A | 1/1999 |
| JP | 2010-58218 A | 3/2010 |
| JP | 2010-064222 A | 3/2010 |
| JP | 2011-131300 A | 7/2011 |
| JP | 2013-071215 A | 4/2013 |

OTHER PUBLICATIONS

European Search Report dated Sep. 16, 2019 in corresponding European Patent Application No. 16889962.3.

* cited by examiner

INSERTION GUIDE AND INSERTION GUIDE DEVICE

TECHNICAL FIELD

The present disclosure relates to an insertion guide to be used at the time of inserting a shaft into a hole, and an insertion guide device to which the insertion guide is applied.

BACKGROUND ART

Hitherto, there has been proposed an insertion guide which is to be provided on a distal end side of a main part of a shaft to enable easy insertion of the shaft into a hole (for example, see Patent Literature 1). Specifically, the insertion guide includes a first guide portion and a second guide portion. The first guide portion has a reduced diameter portion and a groove portion. The reduced diameter portion is reduced in diameter gradually toward a distal end. The groove portion is located on a side of the main part of the shaft with respect to the reduced diameter portion. The second guide portion is located between the first guide portion and the main part of the shaft, and has a diameter smaller than a diameter of the main part of the shaft. The insertion guide accurately performs rotation correction with use of the second guide portion.

CITATION LIST

Patent Literature

[Patent Literature 1] JP 11-10455 A

SUMMARY OF INVENTION

Technical Problem

However, the related art has the following problem.

With the insertion guide described in Patent Literature 1, when the shaft is to be simply inserted into the hole, the rotation correction can be accurately performed. However, there is a problem in that, when a phase between the hole and the shaft is to be corrected, the rotation correction cannot be accurately performed.

Specifically, when a pin for correcting a phase is provided on a side surface inside the hole, and an engagement portion for the pin is provided at a distal end of the shaft, accurate rotation correction cannot be performed due to a rotation moment generated by contact between the pin provided inside the hole and the engagement portion provided at the distal end of the shaft.

The present disclosure has been made to solve the problem described above, and has an object to obtain an insertion guide being capable of performing high-speed insertion of a shaft into a hole while performing accurate rotation correction between a shaft and a hole and phase correction between the shaft and the hole.

Solution to Problem

According to one embodiment of the present disclosure, there is provided an insertion guide to be used at a time of inserting a shaft into a hole, the shaft including: a first guide portion, provided at a distal end of the shaft to be inserted into the hole, and having a diameter smaller than a diameter of the hole; a first narrow cylindrical portion, provided on a base end side of the first guide portion, and having a diameter smaller than the diameter of the first guide portion; a second guide portion, provided on a base end side of the first narrow cylindrical portion, and having a diameter smaller than the diameter of the hole and larger than the diameter of the first narrow cylindrical portion; a second narrow cylindrical portion, provided on a base end side of the second guide portion, and having a diameter smaller than the diameter of the second guide portion; and a third guide portion, provided at the distal end of the shaft, and being a recessed portion to be engaged with a protruding portion formed in the hole to determine a phase being rotation around an axis of the shaft.

Advantageous Effects of Invention

According to the insertion guide of one embodiment of the present disclosure, the shaft includes: the first guide portion, provided at the distal end of the shaft to be inserted into the hole, and having the diameter smaller than the diameter of the hole; the second guide portion, provided on the base end side of the first narrow cylindrical portion, and having the diameter smaller than the diameter of the hole and larger than the diameter of the first narrow cylindrical portion; and the third guide portion, provided at the distal end of the shaft, and being the recessed portion to be engaged with the protruding portion formed in the hole to determine a phase being rotation around the axis of the shaft.

Therefore, high-speed insertion of the shaft into the hole can be performed while performing accurate rotation correction between the shaft and the hole and phase correction between the shaft and the hole.

DESCRIPTION OF EMBODIMENTS

Figure 1:
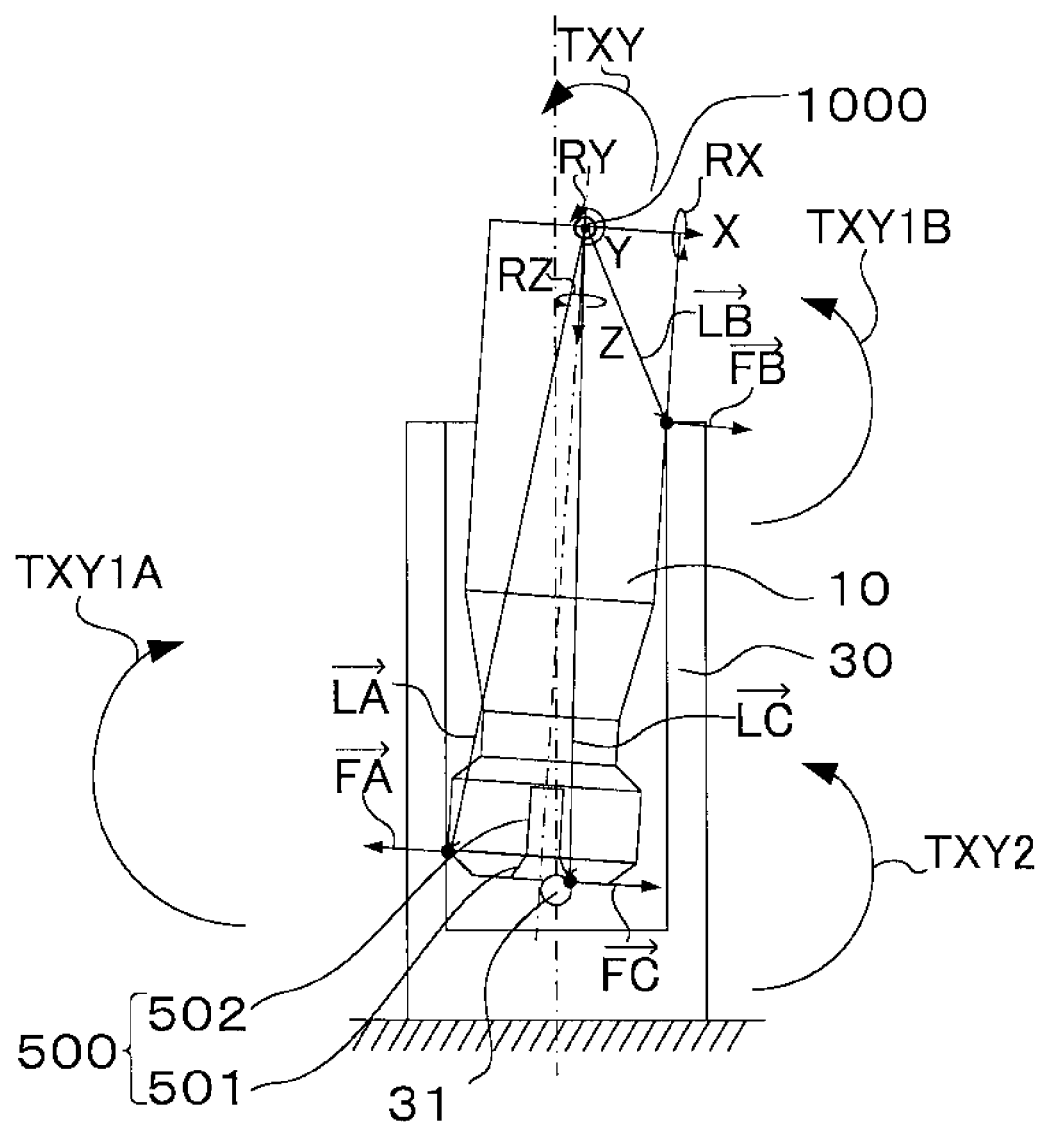
FIG. 1 is a configuration view for illustrating a problem which arises when a function of phase correction is to be added to a related-art insertion guide.

Description is now made of an insertion guide and an insertion guide device according to exemplary embodiments of the present disclosure referring to the accompanying drawings, and throughout the drawings, same or corresponding components are denoted by same reference numerals to describe those components.

First, prior to description of the embodiments, detailed description is made of the problem of the insertion guide described in Patent Literature 1. That is, the problem is that, when a pin for correcting a phase is provided on a side surface inside a hole, and an engagement portion for the pin is provided at a distal end of a shaft, rotation correction cannot be accurately performed.

FIG. 1 is a configuration view for illustrating a problem which arises when a function of phase correction is to be added to a related-art insertion guide. FIG. 1 is an illustration of a case of performing rotation correction of RX and RY and phase correction of RZ, with a force detector 1000 provided at a terminal end of a shaft 10 as a coordinate origin. The term "rotation" refers to rotation around an X axis or a Y axis, and the term "phase" refers to rotation around a Z axis. A hole 30 is formed in a structure.

In FIG. 1, on the side surface inside the hole 30 formed in the structure, a phase guide protruding portion 31 having a pin shape is provided. At a distal end of the shaft 10, a phase guide recessed portion 500 having a tapered part 501 and an engagement part 502 is formed. The shaft 10 and the hole 30 are in contact with each other at a first guide portion and a second guide portion disclosed in Patent Literature 1, and are in contact with each other at the phase guide recessed portion 500 and the phase guide protruding portion 31.

When a phase moment for RZ is generated between the phase guide recessed portion 500 and the phase guide protruding portion 31, rotation moments for RX and RY are also generated simultaneously. Therefore, it cannot be determined in which direction the rotation correction and phase correction are to be performed. In this case, a rotation moment TXY is expressed by the following expressions.

$$TXY = TXY1 - TXY2$$

$$TXY1 = \vec{LA} \times \vec{FA} + \vec{LB} \times \vec{FB} = TXY1A - TXY1B$$

$$TXY2 = \vec{LC} \times \vec{FC}$$

In the expressions described above, the vector LA represents a vector from the force detector 1000 to a contact point between the first guide portion and the hole 30. The vector LB represents a vector from the force detector 1000 to a contact point between the second guide portion and the hole 30. The vector LC represents a vector from the force detector 1000 to a contact point between the phase guide recessed portion 500 and the phase guide protruding portion 31. The vector LA, the vector LB, and the vector LC each have a reference at the force detector 1000. In the following, vectors each similarly have a reference at the force detector 1000.

In the expressions described above, the vector FA represents a force generated at the contact point between the first guide portion and the hole 30. The vector FB represents a force generated at the contact point between the second guide portion and the hole 30. The vector FC represents a force generated at the contact point between the phase guide recessed portion 500 and the phase guide protruding portion 31.

Therefore, the rotation correction cannot be accurately performed, resulting that an insertion operation of the shaft which requires the phase correction cannot be accurately performed. In the following embodiments, description is made of an insertion guide which is capable of performing high-speed insertion of the shaft into the hole while performing the accurate rotation correction between the shaft and the hole and the phase correction between the shaft and the hole.

First Embodiment

Figure 2:
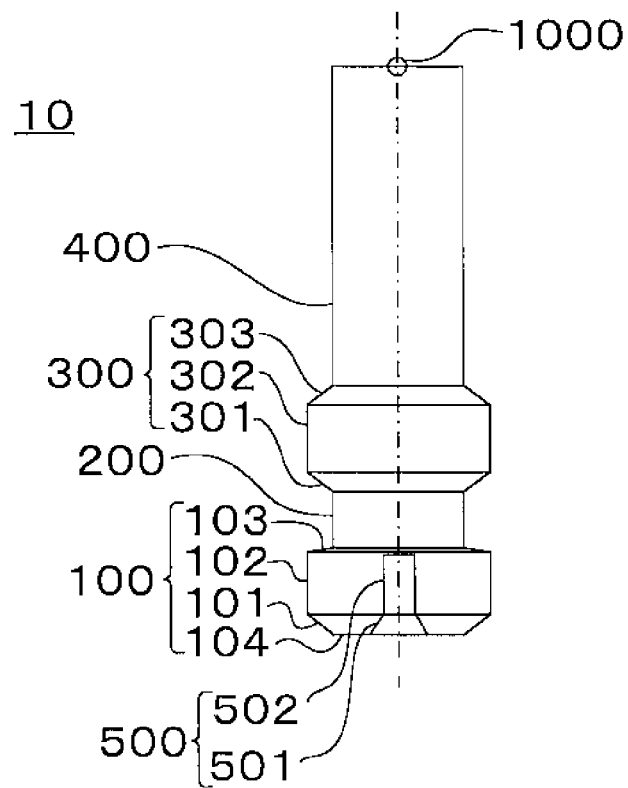
FIG. 2 is a configuration view for illustrating a shaft with an insertion guide according to a first embodiment of the present disclosure.

FIG. 2 is a configuration view for illustrating a shaft with an insertion guide according to a first embodiment of the present disclosure. In FIG. 2, the shaft 10 includes a first guide portion 100, a first narrow cylindrical portion 200, a second guide portion 300, a second narrow cylindrical portion 400, and a phase guide recessed portion 500. The first guide portion 100 is provided at a distal end of the shaft 10, has a diameter smaller than a diameter of the hole 30 formed in the structure, and is configured to perform translation correction with respect to the hole 30. The first narrow cylindrical portion 200 is provided on a base end side of the first guide portion 100, and has a diameter smaller than a diameter of the first guide portion 100. The second guide portion 300 is provided on a base end side of the first narrow cylindrical portion 200, has a diameter smaller than the diameter of the hole 30, and is configured to perform rotation correction with respect to the hole 30. The second narrow cylindrical portion 400 is provided on a base end side of the second guide portion 300, and has a diameter smaller than a diameter of the second guide portion 300. The phase guide recessed portion 500 is provided at a distal end of the shaft 10, and is a third guide portion configured to perform phase correction with respect to the hole 30 through engaging with the phase guide protruding portion 31 provided in the hole 30.

The first guide portion 100 includes a first translation guide 101, a first guide contact surface 102, a first connection portion 103, and a first guide bottom contact surface 104. The first translation guide 101 has a tapered shape, and is configured to guide translation of the shaft 10. The first guide contact surface 102 is brought into contact with an inner surface of the hole 30 formed in the structure. The first connection portion 103 connects the first narrow cylindrical portion 200 and the first guide portion 100 to each other. The first guide bottom contact surface 104 is brought into contact with a hole bottom surface 32 of the hole 30.

The second guide portion 300 includes a second translation guide 301, a second guide contact surface 302, and a second connection portion 303. The second translation guide 301 is configured to guide translation. The second guide contact surface 302 is brought into contact with the inner surface of the hole 30 formed in the structure. The second connection portion 303 connects between the second narrow cylindrical portion 400 and the second guide portion 300.

The phase guide recessed portion 500 being the third guide portion includes a tapered part 501 and an engagement part 502, which are configured to guide a phase between the shaft 10 and the hole 30. In FIG. 2, the phase guide recessed portion 500 is formed in the first guide portion 100.

Figure 3:
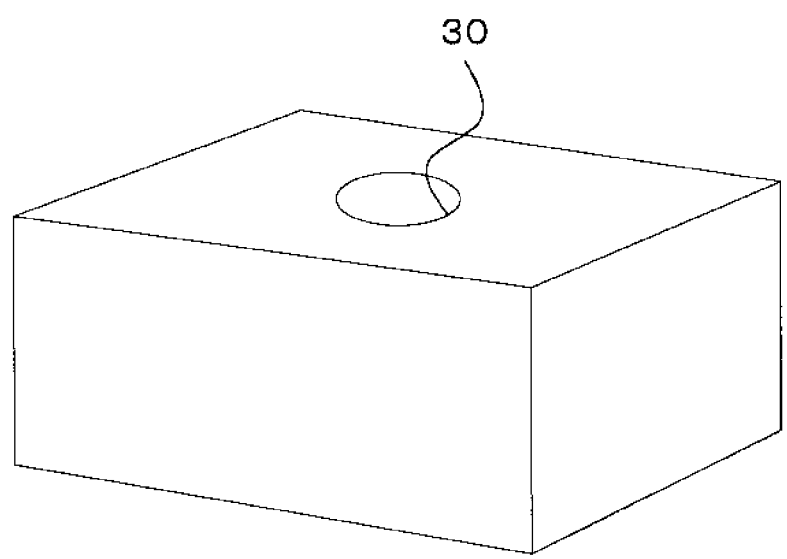
FIG. 3 is a perspective view for illustrating a hole for the insertion guide according to the first embodiment of the present disclosure.
Figure 4:
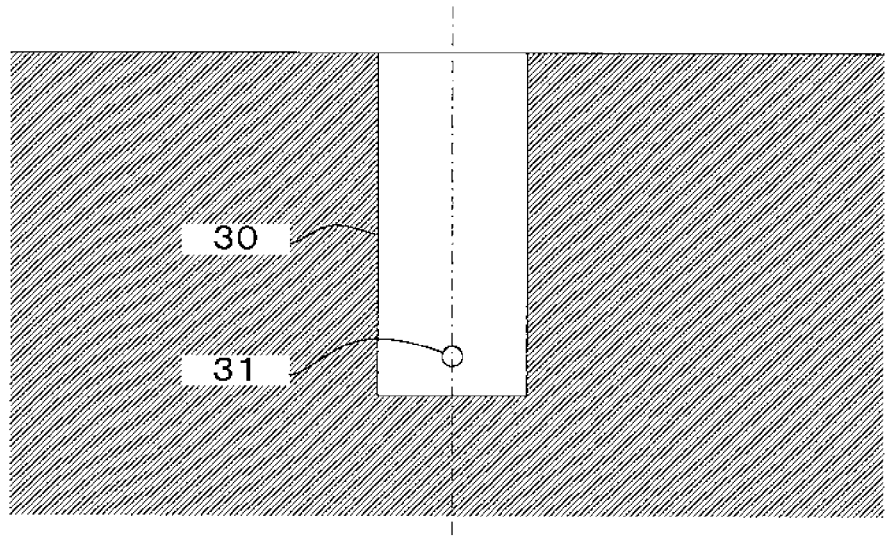
FIG. 4 is a sectional view for illustrating the hole for the insertion guide according to the first embodiment of the present disclosure.
Figure 5:
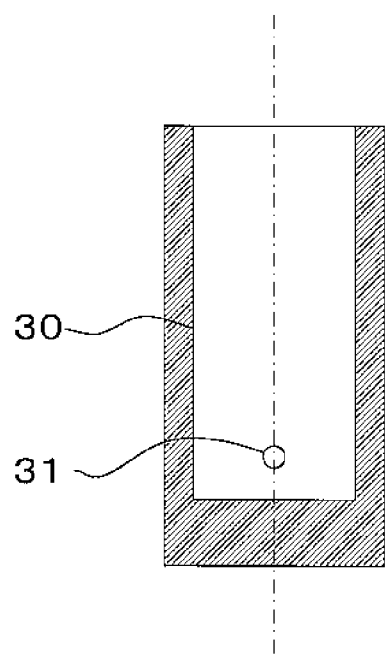
FIG. 5 is a sectional view for illustrating the hole for the insertion guide according to the first embodiment of the present disclosure.

FIG. 3 is a perspective view for illustrating a hole for the insertion guide according to the first embodiment of the present disclosure. FIG. 4 is a sectional view for illustrating the hole for the insertion guide according to the first embodiment of the present disclosure. FIG. 5 is a sectional view for illustrating the hole for the insertion guide according to the first embodiment of the present disclosure, and is an illustration of a case in which the structure around the hole is smaller than that of FIG. 4.

In FIG. 3 to FIG. 5, the hole 30 formed in the structure has a cylindrical shape which enables insertion of the first guide portion 100 and the second guide portion 300 of the shaft 10 thereinto, and the phase guide protruding portion 31 configured to correct the phase is provided on the side surface inside the hole 30.

Now, with reference to FIG. 6 to FIG. 12, description is made of an insertion sequence of inserting the shaft 10 having the configuration described above into the hole 30 formed in the structure. Here, description is made of the case in which the following errors are present. That is, a position error $\Delta EXY$ in an XY direction is present in an XY plane. A rotation error $\Delta REXY$ around XY axes is present. A phase error $\Delta REZ$ around a Z axis is present.

Figure 6:
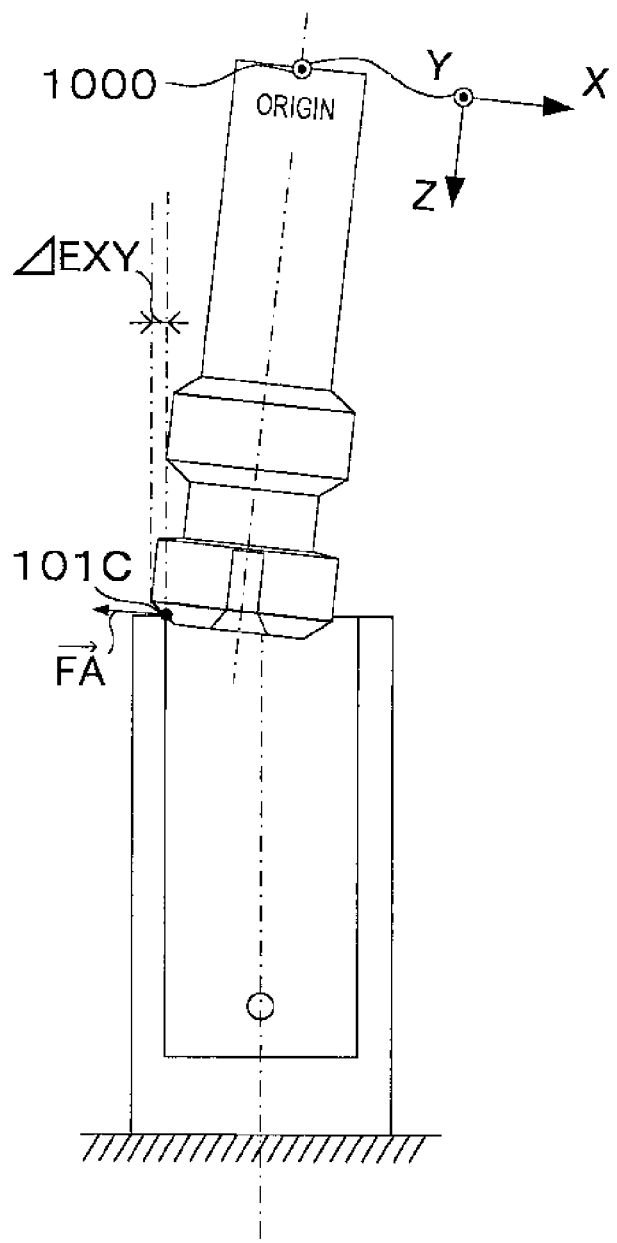
FIG. 6 is an explanatory view for illustrating an insertion sequence of inserting the shaft with the insertion guide according to the first embodiment of the present disclosure into the hole.

In FIG. 6, at an initial position, a diameter of the first translation guide 101 is smaller than a diameter of the hole 30, and hence the shaft 10 is inserted into an inlet of the hole 30 even when the position error $\Delta EXY$ in the XY direction is present.

The position error $\Delta EXY$ in the XY direction is present, and hence the shaft 10 is brought into contact with the hole 30 at a first contact point 101C of the first translation guide 101, and a force FA generated at the first contact point 101C is measured by the force detector 1000. At this time, through movement of the shaft 10 in the translation direction so as to reduce X and Y components of the force FA, the position error $\Delta EXY$ in the XY direction can be corrected.

Figure 7:
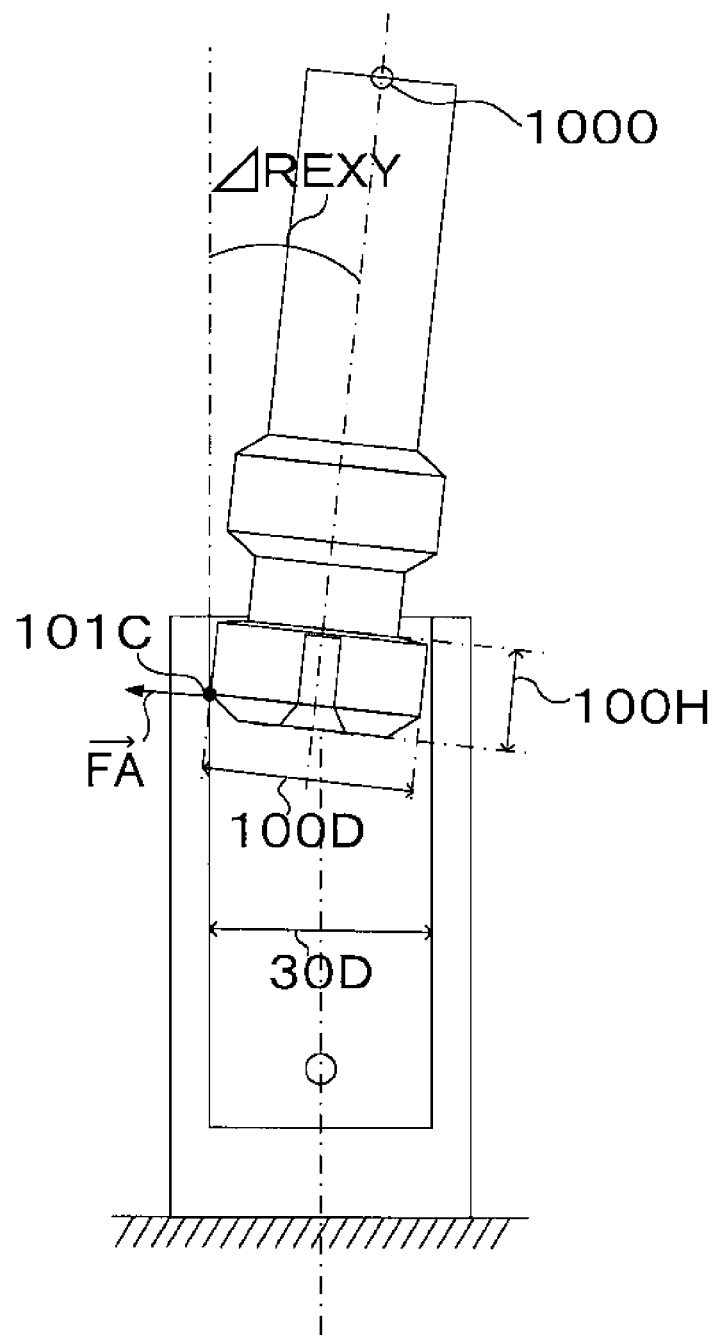
FIG. 7 is an explanatory view for illustrating the insertion sequence of inserting the shaft with the insertion guide according to the first embodiment of the present disclosure into the hole.

FIG. 7 is an illustration of a state in which the first guide portion 100 is inserted into the hole 30 while the first contact point 101C is in contact with the hole 30 but a second contact point is not formed.

In FIG. 7, an inner diameter 30D of the hole 30 and a height 100H and a maximum diameter 100D of the first guide portion 100 are designed so as not to contact between the shaft 10 and the hole 30 at two points inside the hole 30 even when the rotation error $\Delta REXY$ is an assumed maximum rotation error $\Delta REXYmax$. Therefore, the shaft 10 can be smoothly inserted without being locked through only the translation correction in accordance with the force FA generated at the first contact point 101C similarly to FIG. 6.

Specifically, the inner diameter 30D of the hole 30 and the height 100H and the maximum diameter 100D of the first guide portion 100 are designed so as to satisfy a relational expression shown as Expression (1) when the assumed rotation error $\Delta REXY$ is the maximum rotation error $\Delta REXYmax$. When heights of the first translation guide 101 and the first connection portion 103 in the shaft axial direction are considered, a degree of freedom in design for those is increased.

$$30D > 100H \times \sin(\Delta REXY\ max) + 100D \times \cos(\Delta REXY\ max) \quad \text{Expression (1)}$$

Figure 8:
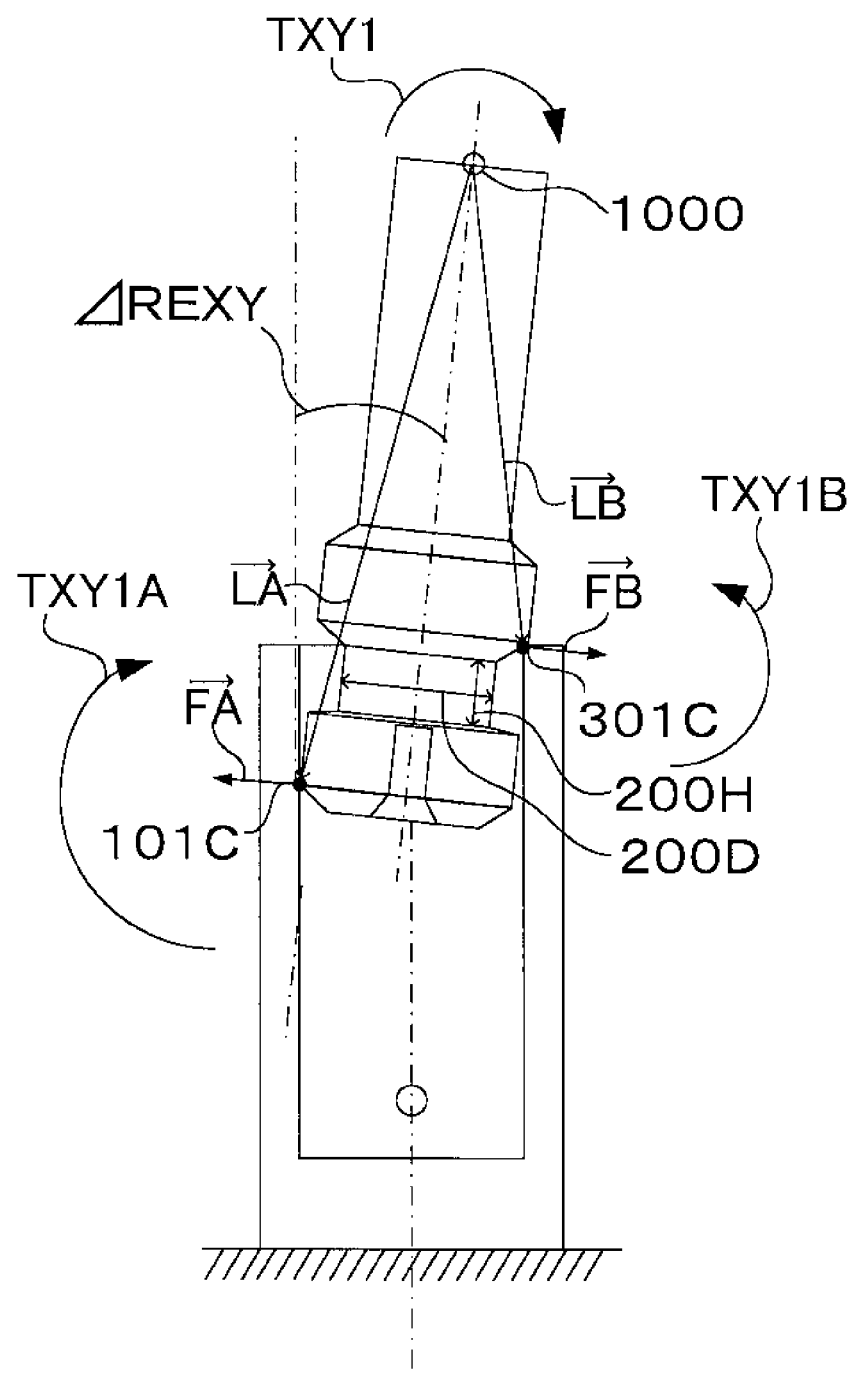
FIG. 8 is an explanatory view for illustrating the insertion sequence of inserting the shaft with the insertion guide according to the first embodiment of the present disclosure into the hole.

FIG. 8 is an illustration of a state in which the shaft 10 and the hole 30 are in contact with each other at the first contact point 101C of the first translation guide 101 and a second contact point 301C of the second translation guide 301. In FIG. 8, a height 200H and a maximum diameter 200D of the first narrow cylindrical portion 200 are designed so that a rotation moment TXY1, which is caused by the force FA generated at the first contact point 101C and a force FB generated at the second contact point 301C, becomes sufficiently larger than a detection resolution 1000RES of the force detector 1000.

Specifically, the height 200H and the maximum diameter 200D of the first narrow cylindrical portion 200 are designed so that a relational expression shown as Expression (2) is satisfied between the rotation moment TXY1, which is caused by the force FA generated at the first contact point 101C and the force FB generated at the second contact point 301C, and the detection resolution 1000RES of the force detector 1000.

$$TXY1 = \vec{LA} \times \vec{FA} + \vec{LB} \times \vec{FB} = TXY1A - TXY1B > 1000RES \quad \text{Expression (2)}$$

In Expression (2), the vector LA represents a vector from the force detector 1000 to the first contact point 101C, and the vector LB represents a vector from the force detector 1000 to the second contact point 301C. The vector FA represents a force generated at the first contact point 101C, and the vector FB represents a force generated at the second contact point 301C.

The vector LA and the vector LB are both vectors calculated based on the height 100H of the first guide portion 100 of the shaft 10 and the height 200H and the maximum diameter 200D of the first narrow cylindrical portion 200 of the shaft 10. With this, the rotation direction for correcting the rotation error ΔREXY can be accurately detected.

Figure 9:
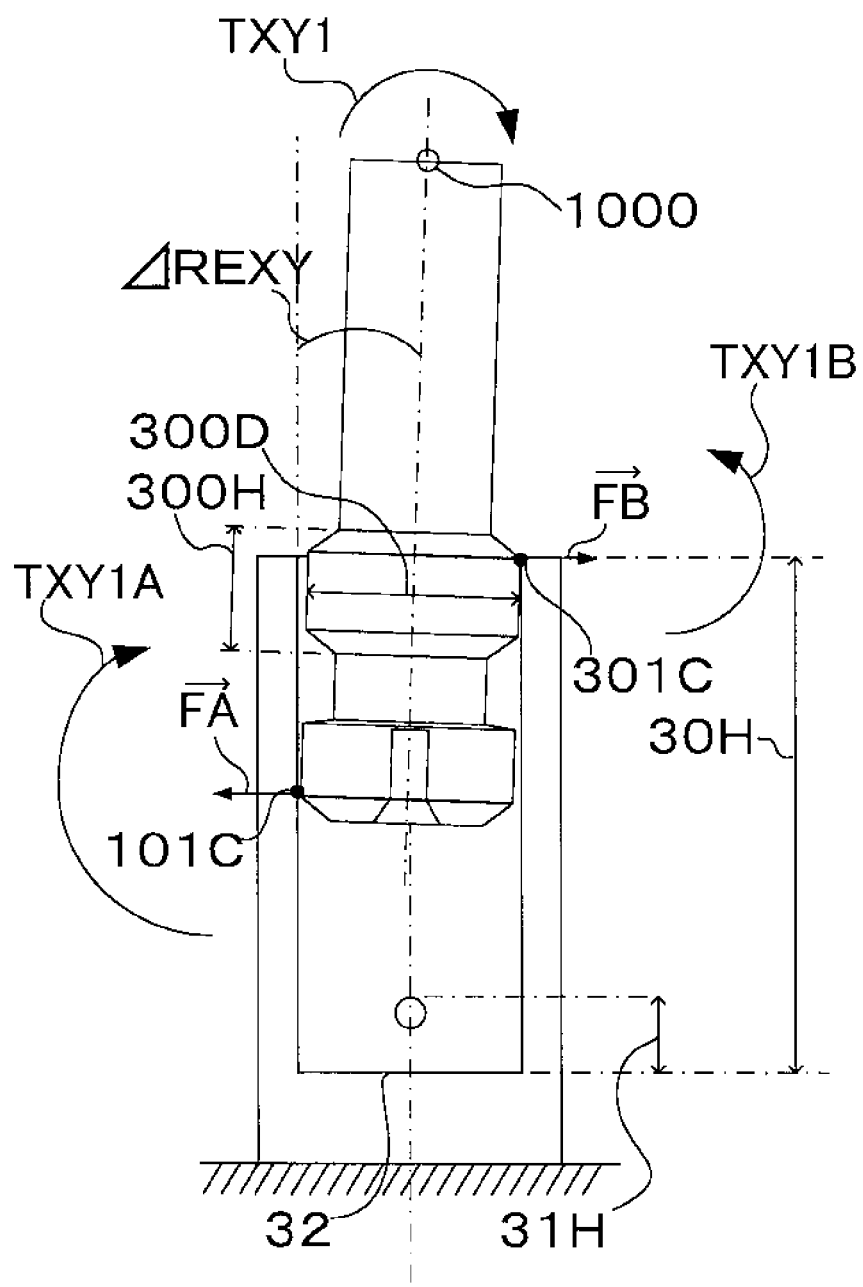
FIG. 9 is an explanatory view for illustrating the insertion sequence of inserting the shaft with the insertion guide according to the first embodiment of the present disclosure into the hole.

Description has been made, with reference to FIG. 8, of the case in which the second contact point 301C is provided on the second translation guide 301. However, the second contact point 301C may be provided on the first narrow cylindrical portion 200 or, as illustrated in FIG. 9, on the second guide contact surface 302. In any of those cases, the rotation direction for correcting the rotation moment TXY1 and the rotation error ΔREXY of the shaft 10 has a unique relationship, thereby being capable of smoothly performing correction of the rotation error.

A height 300H of the second guide portion 300 is designed so as to satisfy a relational expression shown as Expression (3). Here, 300D=100D is assumed.

$$30H - 31H/\cos \Delta REXY \min > 100H + 200H + 300H \quad \text{Expression (3)}$$

In Expression (3), 30H represents a depth of the hole 30, and 31H represents a distance between an upper end of the phase guide protruding portion 31 and the hole bottom surface 32 in FIG. 9. A minimum rotation error ΔREXYmin represents a rotation error which remains under a state in which the second guide portion 300 illustrated in FIG. 9 is inserted into the hole 30. The minimum rotation error ΔREXYmin is expressed by Expression (4) when 100D=300D is assumed. When heights of the second translation guide 301 and the second connection portion 303 in the shaft axial direction are considered, the degree of freedom in design of those is increased.

$$\Delta REXY \min = \arcsin(30D - 100D \times \cos \Delta REXY \min / 100H + 200H + 300H) \quad \text{Expression (4)}$$

With this, the rotation error ΔREXY can be reduced to the minimum rotation error ΔREXYmin by completing the rotation correction with use of the first guide portion 100 and the second guide portion 300 before the phase guide protruding portion 31 and the phase guide recessed portion 500 for correction of the phase are brought into contact with each other.

Figure 10:
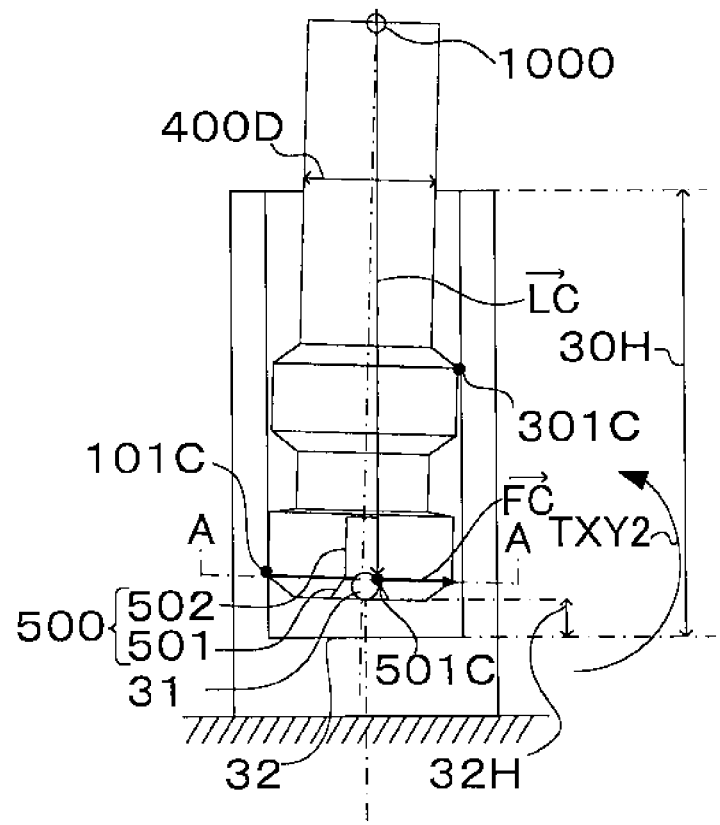
FIG. 10 is an explanatory view for illustrating the insertion sequence of inserting the shaft with the insertion guide according to the first embodiment of the present disclosure into the hole.
Figure 11:
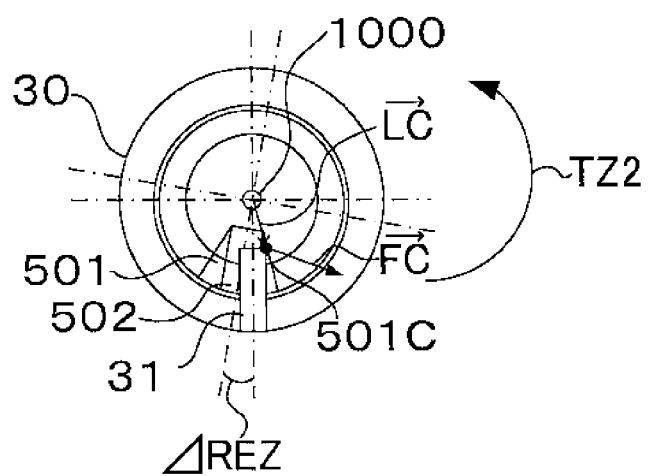
FIG. 11 is an explanatory view for illustrating the insertion sequence of inserting the shaft with the insertion guide according to the first embodiment of the present disclosure into the hole.

FIG. 10 is an illustration of a state in which the shaft 10 is inserted into the hole 30 after completion of the rotation correction, and in which the tapered part 501 of the phase guide recessed portion 500 and the phase guide protruding portion 31 are in contact with each other. FIG. 11 is an illustration of a cross section taken along the line A-A in FIG. 10, and is an illustration of a method for correcting the phase error ΔREZ.

When the phase error ΔREZ is present, the tapered part 501 and the phase guide protruding portion 31 are brought into contact with each other at a third contact point 501C. With this, a force FC is generated, and a rotation moment TXY2 and a phase moment TZ2 are generated at the force detector 1000.

In this case, the rotation correction is completed before changing to the state shown in FIG. 9, and the rotation error ΔREXY is reduced to the minimum rotation error ΔREXYmin. Therefore, the rotation correction is not performed even when the rotation moment TXY2 is detected, and the phase can be corrected so as to reduce the phase moment TZ2.

In order to prevent from forming any contact point other than the first contact point 101C, the second contact point 301C, and the third contact point 501C before completion of correction of the phase, the second narrow cylindrical portion 400 is provided. A maximum diameter 400D of the second narrow cylindrical portion 400 is designed so as to satisfy a relational expression shown as Expression (5).

$$\arctan((100D - 400D)/2/\{(30H - 32H)/\cos(\Delta REXY \min) - 100H - 200H - 300H\}) > \Delta REXY \min \quad \text{Expression (5)}$$

In Expression (45), 32H represents a distance between a lower end of the phase guide protruding portion 31 and the hole bottom surface 32 in FIG. 10. With this, occurrence of another contact state during the phase correction is prevented, thereby being capable of smoothly correcting the phase.

Figure 12:
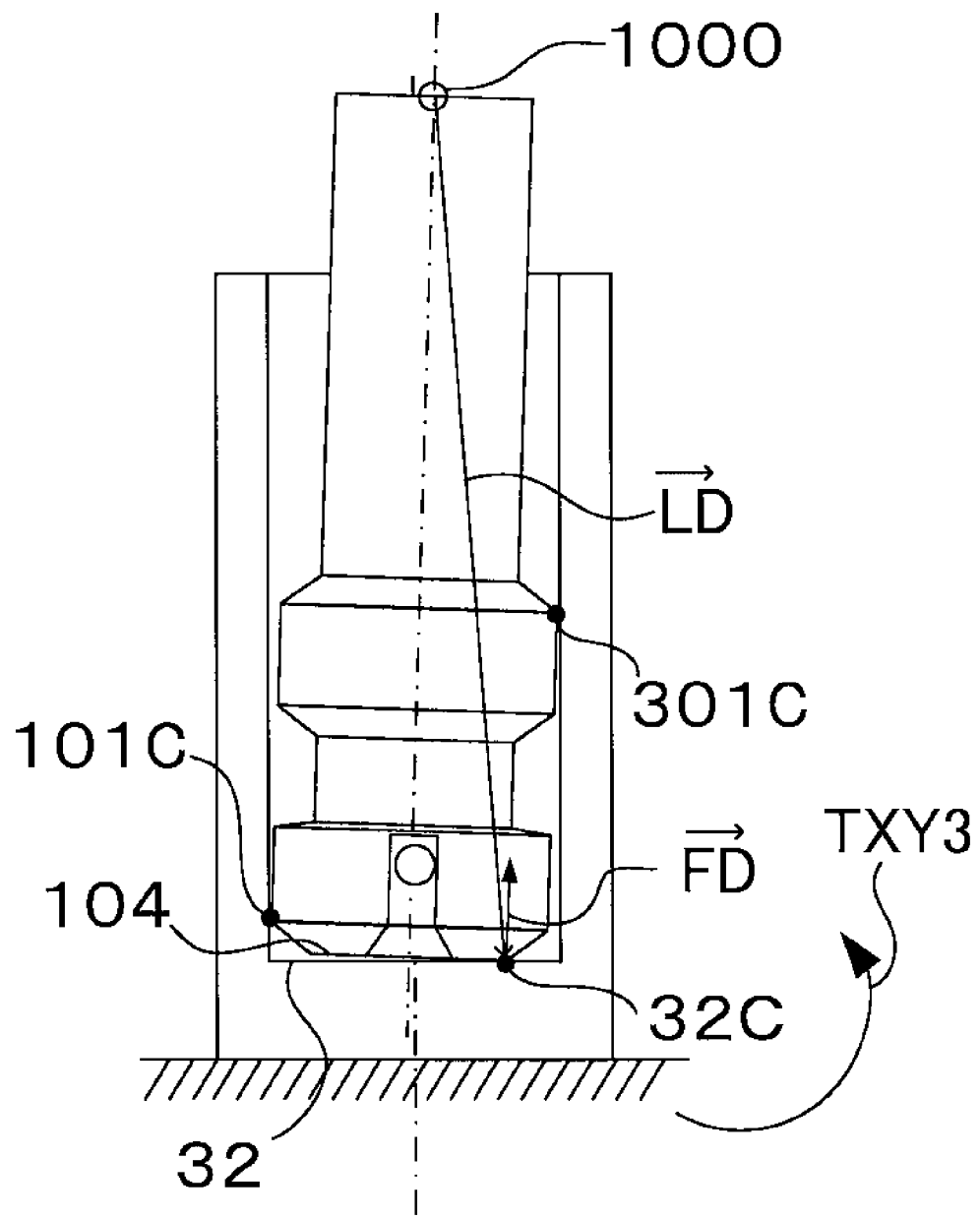
FIG. 12 is an explanatory view for illustrating the insertion sequence of inserting the shaft with the insertion guide according to the first embodiment of the present disclosure into the hole.

FIG. 12 is an illustration of a state in which the phase correction is completed, and the first guide bottom contact surface 104 of the first guide portion 100 and the hole bottom surface 32 of the hole 30 are in contact with each other. Here, illustration shows a method for correcting the position error ΔEXY in the XY direction and the rotation error ΔREXY which is not completely corrected before changing to the state shown in FIG. 9.

When the position error ΔEXY in the XY direction and the rotation error ΔREXY are present, the first guide bottom contact surface 104 and the hole bottom surface 32 are brought into slant contact with each other at a fourth contact point 32C to generate a force FD, and a rotation moment TXY3 is detected by the force detector 1000. Therefore, the position error ΔEXY in the XY direction and the rotation error ΔREXY can be corrected to be smaller so as to reduce the rotation moment TXY3.

The first guide contact surface 102 of the first guide portion 100, the second guide contact surface 302 of the second guide portion 300, or both the first guide contact surface 102 of the first guide portion 100 and the second guide contact surface 302 of the second guide portion 300 are brought into contact with the hole 30. With this, even under a state in which the shaft 10 is inclined from the gravity vertical direction with respect to the hole 30, the line contact or the surface contact is obtained, thereby being capable of increasing the load capacity.

As described above, according to the first embodiment, the shaft includes: the first guide portion, which is provided at the distal end of the shaft to be inserted into the hole, and has the diameter smaller than the diameter of the hole; the second guide portion, which is provided on the base end side of the first narrow cylindrical portion, and has the diameter smaller than the diameter of the hole and larger than the diameter of the first narrow cylindrical portion; the third guide portion, which is provided at the distal end of the shaft, and is the recessed portion to be engaged with the protruding portion provided in the hole to determine a phase being rotation around the axis of the shaft. The shaft has such a shape that the shaft, which is inserting into the hole and is inclined with respect to the hole, is brought into contact with the hole at two points or less before the third guide portion is brought into contact with the protruding portion.

In other words, the shaft 10 has such a shape that the shaft 10, which is inserting into the hole 30, is brought into contact with the hole 30 at two points or less even before the third guide portion is brought into contact with the protruding portion, even if the shaft 10 is inclined with respect to the hole 30. At the time point at which the third guide portion is brought into contact with the protruding portion, the shaft 10 is in contact with the hole 30 at two points or less, and the rotation moment TXY2 and the phase moment TZ2 can be determined separately, thereby being capable of performing easily the phase correction.

Therefore, high-speed insertion of the shaft into the hole can be performed while performing the accurate rotation correction between the shaft and the hole and the phase correction between the shaft and the hole.

Second Embodiment

Figure 13:
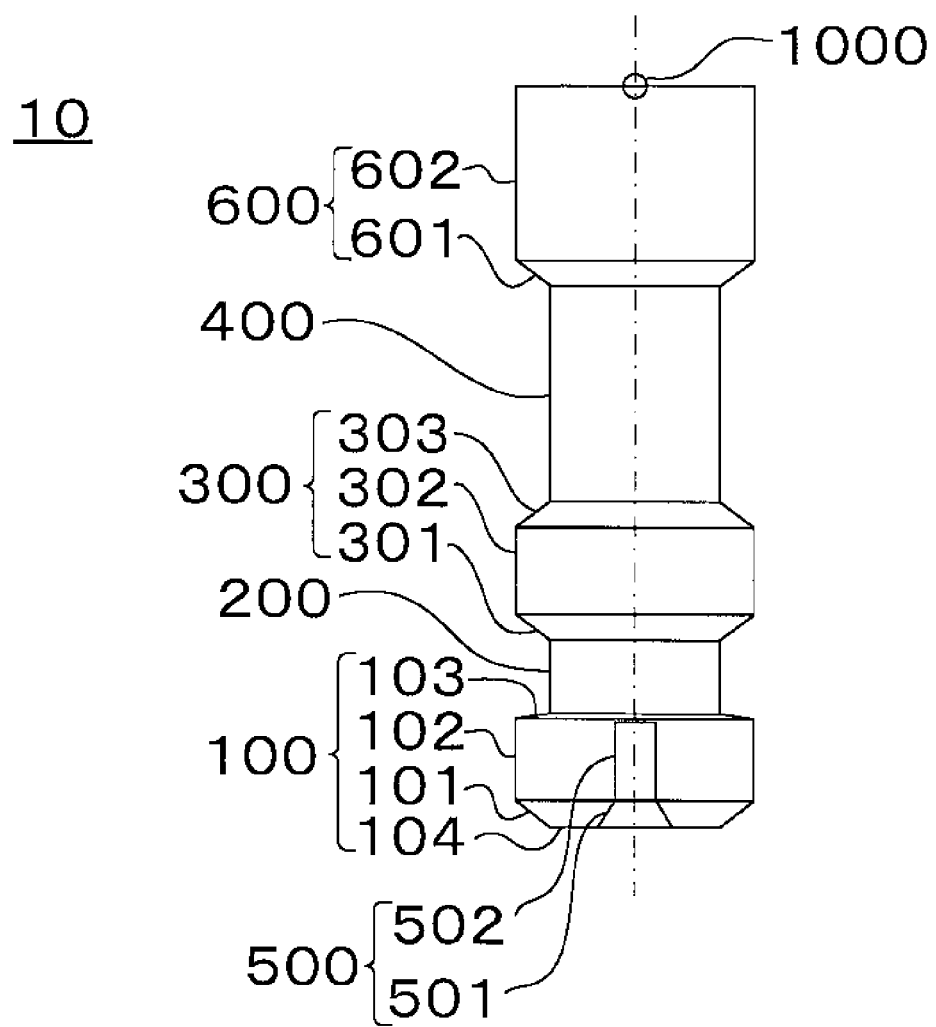
FIG. 13 is a configuration view for illustrating a shaft with an insertion guide according to a second embodiment of the present disclosure.

FIG. 13 is a configuration view for illustrating a shaft with an insertion guide according to a second embodiment of the present disclosure. In FIG. 13, the shaft 10 further includes a fourth guide portion 600 in addition to the configuration of the shaft 10 illustrated in FIG. 2. The fourth guide portion 600 is provided on the base end side of the second narrow cylindrical portion 400, has a diameter smaller than a diameter of the hole 30, and is configured to perform rotation correction with respect to the hole 30.

The fourth guide portion 600 includes a fourth translation guide 601 and a fourth guide contact surface 602. The fourth translation guide 601 is configured to guide translation. The fourth guide contact surface 602 is brought into contact with an inner surface of the hole 30 formed in the structure.

Now, with reference to FIG. 6 to FIG. 11, FIG. 14, and FIG. 15, description is made of an insertion sequence of inserting the shaft 10 having the configuration described above into the hole 30 formed in the structure. Here, description is made of the case in which the following errors are present. That is, a position error ΔEXY in an XY direction is present in an XY plane. A rotation error ΔREXY around XY axes is present. A phase error ΔREZ around a Z axis is present.

Figure 14:
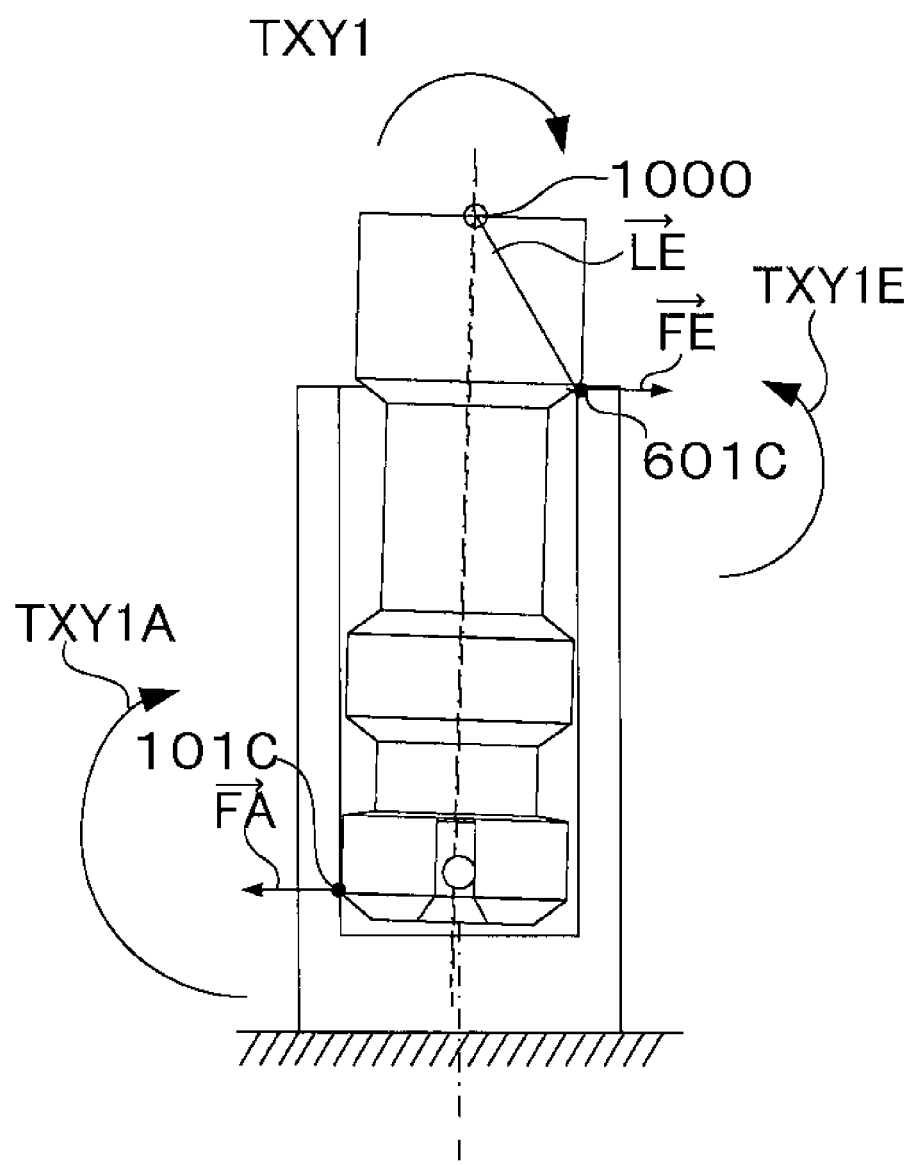
FIG. 14 is an explanatory view for illustrating an insertion sequence of inserting the shaft with the insertion guide according to the second embodiment of the present disclosure into a hole.

First, the insertion sequence corresponding to FIG. 6 to FIG. 11 is the same as the insertion sequence described above as the first embodiment. FIG. 14 is an illustration of a state in which the phase correction is completed, and the fourth translation guide 601 of the fourth guide portion 600 and the hole 30 are in contact with each other. Here, illustration shows a method for correcting the rotation error ΔREXY which remains in the state in which the phase correction illustrated in FIG. 11 is completed.

After the correction of the phase error ΔREZ is completed, when the fourth translation guide 601 and the hole 30 are brought into contact with each other at a fifth contact point 601C and a force FE is generated, two-point contact including the first contact point 101C of the first guide portion 100 is performed, and the rotation moment TXY1 is detected by the force detector 1000. It is preferred that the shaft 10 have such a shape that the shaft 10, which is inserting into the hole 30, is brought into contact with the hole 30 at two points or less before the third guide portion is brought into contact with the protruding portion, even if the shaft 10 is inclined with respect to the hole 30. At this time, the rotation correction for the shaft 10 is performed so as to reduce the rotation moment TXY1, thereby being capable of further reducing the rotation error ΔREXY. The rotation moment TXY1 is expressed by Expression (6).

$$TXY1 = \vec{LA} \times \vec{FA} + \vec{LE} \times \vec{FE} = TXY1A - TXY1E \quad \text{Expression (6)}$$

In order to prevent the phase guide protruding portion 31 from being brought into contact with the bottom surface of the phase guide recessed portion 500 before the fifth contact point 601C is formed, a height 400H of the second narrow cylindrical portion 400 and a depth 500H of the phase guide recessed portion 500 are designed so as to satisfy a relational expression shown as Expression (7).

$$(30H-31H)/\cos(\Delta REXY\,\text{min}) > 100H + 200H + 300H + 400H - 500H \quad \text{Expression (7)}$$

In order to prevent the first guide bottom contact surface 104 from being brought into contact with the hole bottom surface 32 before the fifth contact point 601C is formed, the height 400H of the second narrow cylindrical portion 400 is designed so as to satisfy a relational expression shown as Expression (8).

$$30H/\cos(\Delta REXY\,\text{min}) > 100H + 200H + 300H + 400H \quad \text{Expression (8)}$$

Figure 15:
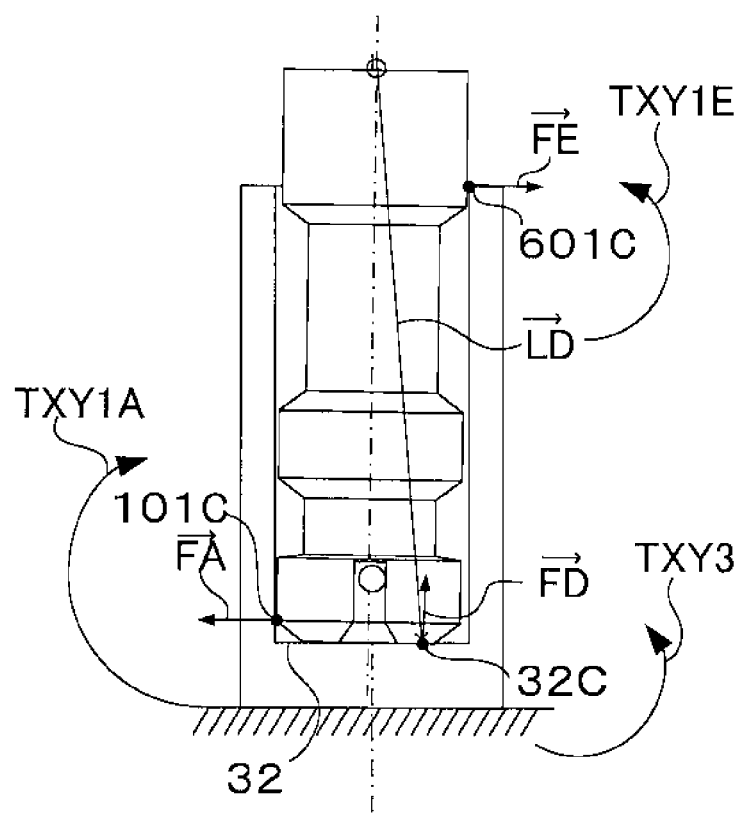
FIG. 15 is an explanatory view for illustrating the insertion sequence of inserting the shaft with the insertion guide according to the second embodiment of the present disclosure into the hole.
Figure 16:
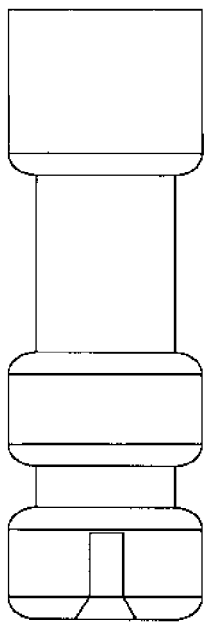
FIG. 16 is another configuration view for illustrating the shaft with the insertion guide according to the first and second embodiments of the present disclosure.
Figure 17:
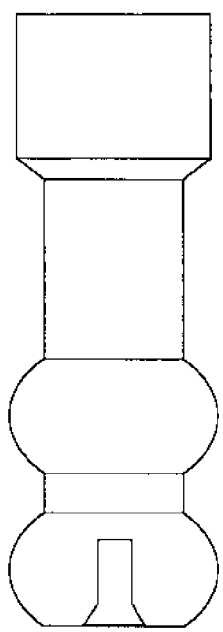
FIG. 17 is still another configuration view for illustrating the shaft with the insertion guide according to the first and second embodiments of the present disclosure.
Figure 18:
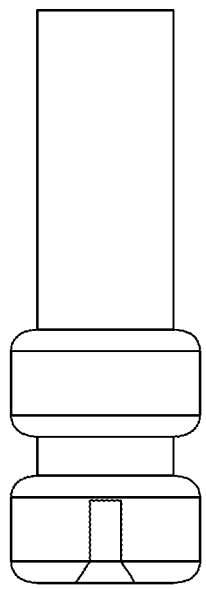
FIG. 18 is still another configuration view for illustrating the shaft with the insertion guide according to the first and second embodiments of the present disclosure.
Figure 19:
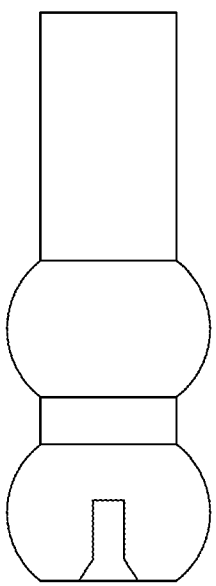
FIG. 19 is still another configuration view for illustrating the shaft with the insertion guide according to the first and second embodiments of the present disclosure.

In Expressions (7) and (8), the minimum rotation error ΔREXYmin represents a rotation error which remains under the state in which the fourth guide portion 600 illustrated in FIG. 15 is inserted into the hole 30. The minimum rotation error ΔREXYmin is expressed by Expression (9) when 100D=600D is assumed.

$$\Delta REXY\,\text{min} = \arctan(30D - 100D \times \cos \Delta REXY\,\text{min}/30H) \quad \text{Expression (9)}$$

As can be understood from Expression (9), the minimum rotation error ΔREXYmin in the second embodiment of the present disclosure can be reduced so as to be smaller than the minimum rotation error ΔREXYmin in the first embodiment described above. When the height of the third translation guide 601 in the shaft axial direction is considered, the degree of freedom in design of those is increased.

FIG. 15 is an illustration of a state in which the first guide bottom contact surface 104 of the first guide portion 100 and the hole bottom surface 32 of the hole 30 are in contact with each other. Here, illustration shows a method for correcting the position error ΔEXY in the XY direction and the rotation error ΔREXY which is not completely corrected in changing to the state shown in FIG. 14.

When the position error ΔEXY in the XY direction and the rotation error ΔREXY are present, the first guide bottom contact surface 104 and the hole bottom surface 32 are brought into slant contact with each other at the fourth contact point 32C, the force FD is generated, and the rotation moment TXY3 is detected by the force detector 1000. Therefore, the position error ΔEXY in the XY direction and the rotation error ΔREXY can be corrected so as to reduce the rotation moment TXY3.

As described above, according to the second embodiment, the shaft includes the fourth guide portion in addition to the configuration of the shaft in the first embodiment described above. The fourth guide portion is provided on the base end side of the second narrow cylindrical portion, has a diameter smaller than a diameter of the hole, and is configured to perform the rotation correction with respect to the hole.

Therefore, the rotation correction between the shaft and the hole can be performed more accurately.

In the first and second embodiments described above, as illustrated in FIG. 2 and FIG. 13, the first translation guide 101 and the first connection portion 103 of the first guide portion 100 of the shaft 10, the second translation guide 301 and the second connection portion 303 of the second guide portion 300, and the fourth translation guide 601 of the fourth guide portion 600 are depicted with straight lines.

However, the present disclosure is not limited to this. The first translation guide 101 and the first connection portion 103 of the first guide portion 100, the second translation guide 301 and the second connection portion 303 of the second guide portion 300, and the fourth translation guide 601 of the fourth guide portion 600 may have a shape having a curvature including a spherical shape. Specifically, the shaft 10 may have the shapes as illustrated in FIG. 16 to FIG. 19.

With this, it can be expected that the contact pressure generated when the shaft 10 and the hole 30 are in contact with each other at the first contact point 101C, the second contact point 301C, or the fifth contact point 601C be reduced.

In this case, the first translation guide 101 and the first connection portion 103 of the first guide portion 100, the second translation guide 301 and the second connection portion 303 of the second guide portion 300, and the fourth translation guide 601 of the fourth guide portion 600 may have a shape in any suitable combination of a linear shape and a shape having a curvature including a spherical shape.

Third Embodiment

In the first and second embodiments described above, description is made of the case in which the function of performing the translation correction and the rotation correction is provided on the shaft 10 side. However, the present disclosure is not limited to this. The function of performing the translation correction and the rotation correction may be provided on the hole 30 side.

Figure 20:
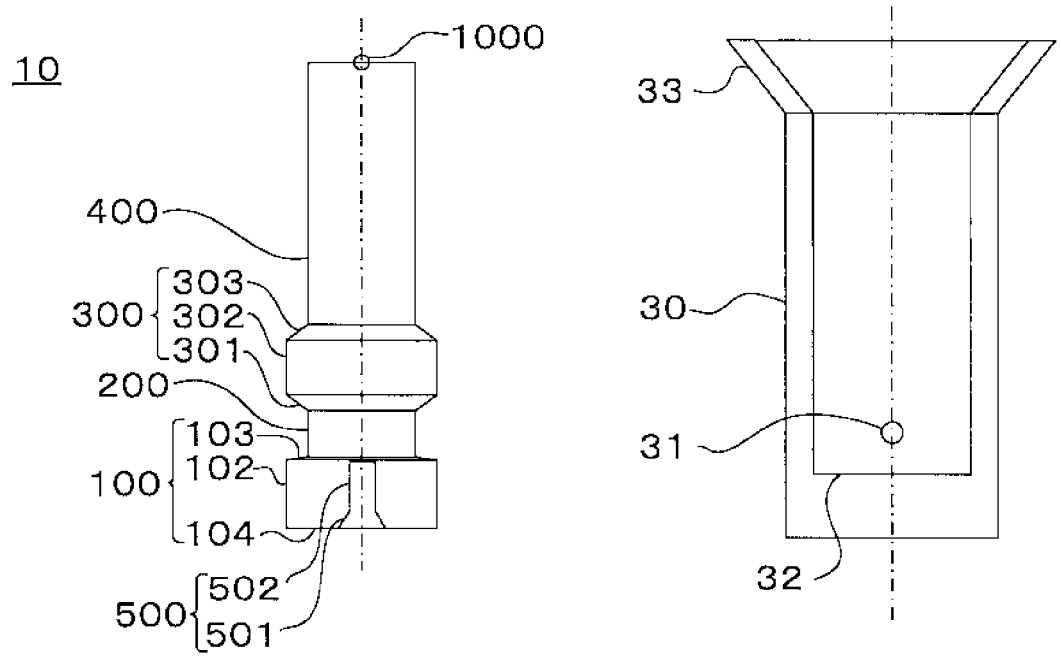
FIG. 20 is a configuration view for illustrating a shaft and a hole of an insertion guide according to a third embodiment of the present disclosure.

FIG. 20 is a configuration view for illustrating the shaft and the hole of the insertion guide according to the third embodiment of the present disclosure. In FIG. 20, illustration shows the case in which the function of the translation correction with respect to the hole 30 performed with the first translation guide 101 of the shaft 10 described above in the first embodiment is provided on the hole 30 side.

In FIG. 20, the first translation guide 101 of the shaft 10 illustrated in FIG. 2 is omitted from the shaft 10, and a hole translation guide 33 having a tapered shape configured to guide the translation is provided to the hole 30.

With this, as compared to the case in which the translation guide function is provided to the shaft 10, the hole translation guide 33 is increased in size, thereby being capable of correcting easily a larger position error ΔEXY.

Figure 21:
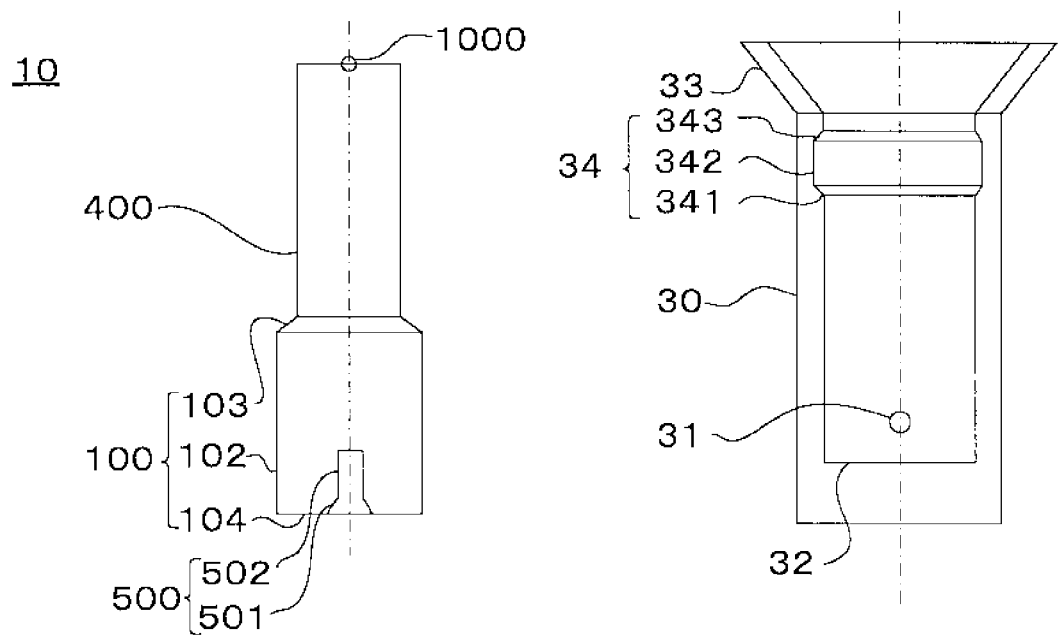
FIG. 21 is another configuration view for illustrating the shaft and the hole of the insertion guide according to the third embodiment of the present disclosure.

FIG. 21 is another configuration view for illustrating the shaft and the hole of the insertion guide according to the third embodiment of the present disclosure. In FIG. 21, in addition to the configuration of the hole translation guide 33 illustrated in FIG. 20, the function of the first narrow cylindrical portion 200 of the shaft 10 described above in the first embodiment is provided on the hole 30 side.

Specifically, the first narrow cylindrical portion 200 of the shaft 10 has a function of securing a sufficient distance between the first contact point 101C and the second contact point 301C so that the rotation moment TXY1 generated by the rotation error of the first narrow cylindrical portion 200 is equal to or larger than the detection resolution 1000RES of the force detector 1000.

In FIG. 21, the first narrow cylindrical portion 200 of the shaft 10 and the second guide portion 300 illustrated in FIG. 2 are omitted from the shaft 10, and a wide cylindrical portion 34 corresponding to the first narrow cylindrical portion 200 is provided to the hole 30.

The wide cylindrical portion 34 includes a wide cylindrical portion translation guide 341 configured to guide translation, a wide cylindrical portion side surface 342 to be brought into contact with the shaft 10, and a wide cylindrical portion connection portion 343 connected to the hole translation guide 33. With this, the rigidity of the shaft 10 can be enhanced.

Figure 22:
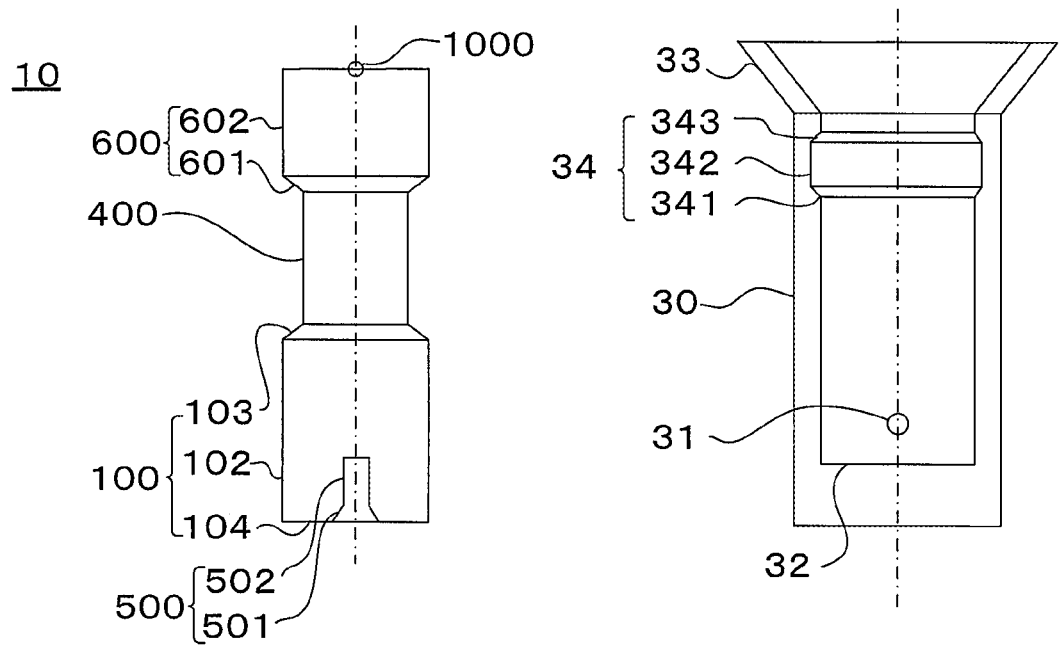
FIG. 22 is still another configuration view for illustrating the shaft and the hole of the insertion guide according to the third embodiment of the present disclosure.

FIG. 22 is still another configuration view for illustrating the shaft and the hole of the insertion guide according to the third embodiment of the present disclosure. In FIG. 22, illustration shows a configuration in which, in addition to the configuration of the shaft 10 illustrated in FIG. 21, the fourth guide portion 600 having a diameter smaller than a diameter of the hole 30 and being configured to perform the rotation correction with respect to the hole 30 is provided on the base end side of the second narrow cylindrical portion 400.

The fourth guide portion 600 includes a fourth translation guide 601 and a fourth guide contact surface 602. The fourth translation guide 601 is configured to guide the translation. The guide contact surface 602 is brought into contact with the inner surface of the hole 30 formed in the structure. With this, the rotation correction can be completed before the phase guide recessed portion 500 and the phase guide protruding portion 31 are brought into contact with each other, thereby being capable of reducing the rotation error ΔREXY as compared to the insertion guide illustrated in FIG. 21.

Fourth Embodiment

Figure 23:
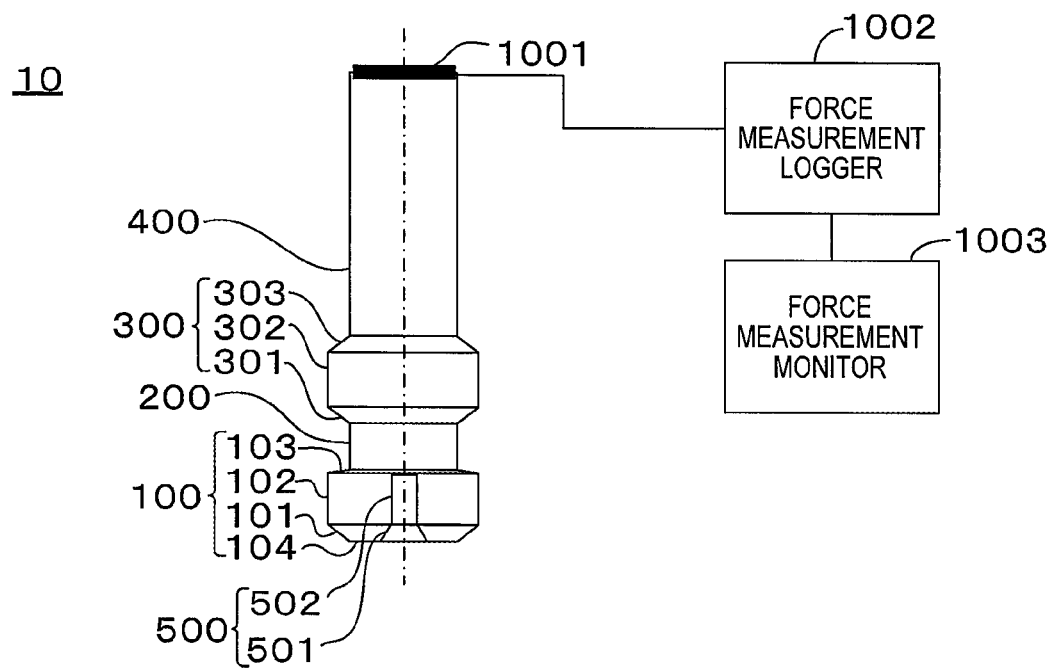
FIG. 23 is a configuration view for illustrating a shaft with an insertion guide according to a fourth embodiment of the present disclosure.

FIG. 23 is a configuration view for illustrating a shaft with an insertion guide according to a fourth embodiment of the present disclosure. In FIG. 23, a 6-axis force sensor 1001 is mounted as the force detector 1000 for the shaft 10. The 6-axis force sensor 1001 is connected to a force measurement logger 1002, and the force measurement logger 1002 is connected to a force measurement monitor 1003. An operator inserts the shaft 10 into the hole 30 while checking an output of the 6-axis force sensor 1001 with the force measurement monitor 1003.

With this, the 6-axis force can be monitored quantitatively, thereby being capable of performing accurately the position correction, the rotation correction, and the phase correction. The load applied at the time of inserting the shaft 10 can be recorded with use of the force measurement logger 1002. The 6-axis force sensor 1001, the force measurement logger 1002, and the force measurement monitor 1003 can be applied to any of the shafts 10 described in the first to third embodiments.

Fifth Embodiment

Figure 24:
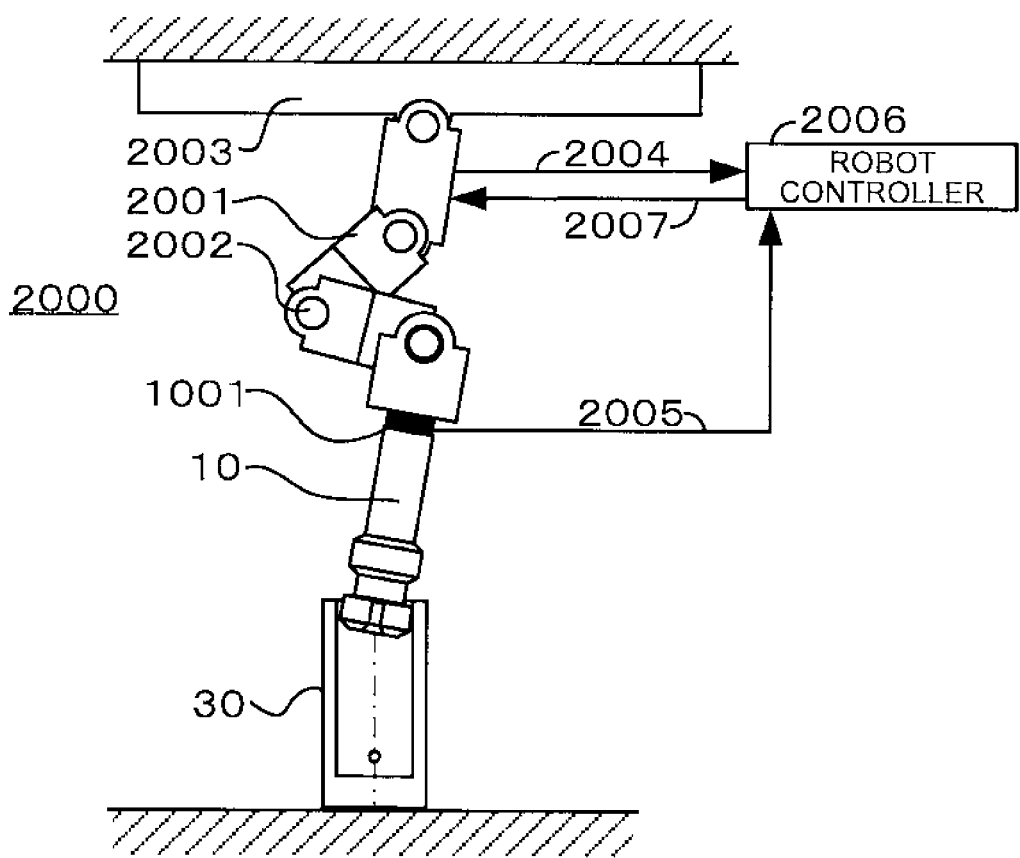
FIG. 24 is a configuration view for illustrating an insertion guide device to which an insertion guide according to a fifth embodiment of the present disclosure is applied.

FIG. 24 is a configuration view for illustrating an insertion guide device to which the insertion guide according to the fourth embodiment of the present disclosure is applied. In FIG. 24, illustration shows a configuration in which the shaft 10 is automatically inserted into the hole 30 with use of a robot. The shape of the shaft 10 may be any of the shapes of the shafts described in the first to third embodiments.

In FIG. 24, a robot 2000 includes a drive link 2001 and a joint angle sensor 2002 for the drive link 2001, and is mounted to a base 2003. A joint angle signal 2004 output from the joint angle sensor 2002 and a 6-axis force sensor signal 2005 from the 6-axis force sensor 1001 mounted as the force detector 1000 for the shaft 10 are taken as feedback signals by a robot controller 2006, and a joint angle command signal 2007 is output to the drive link 2001 so as to achieve a target joint angle.

Figure 25:
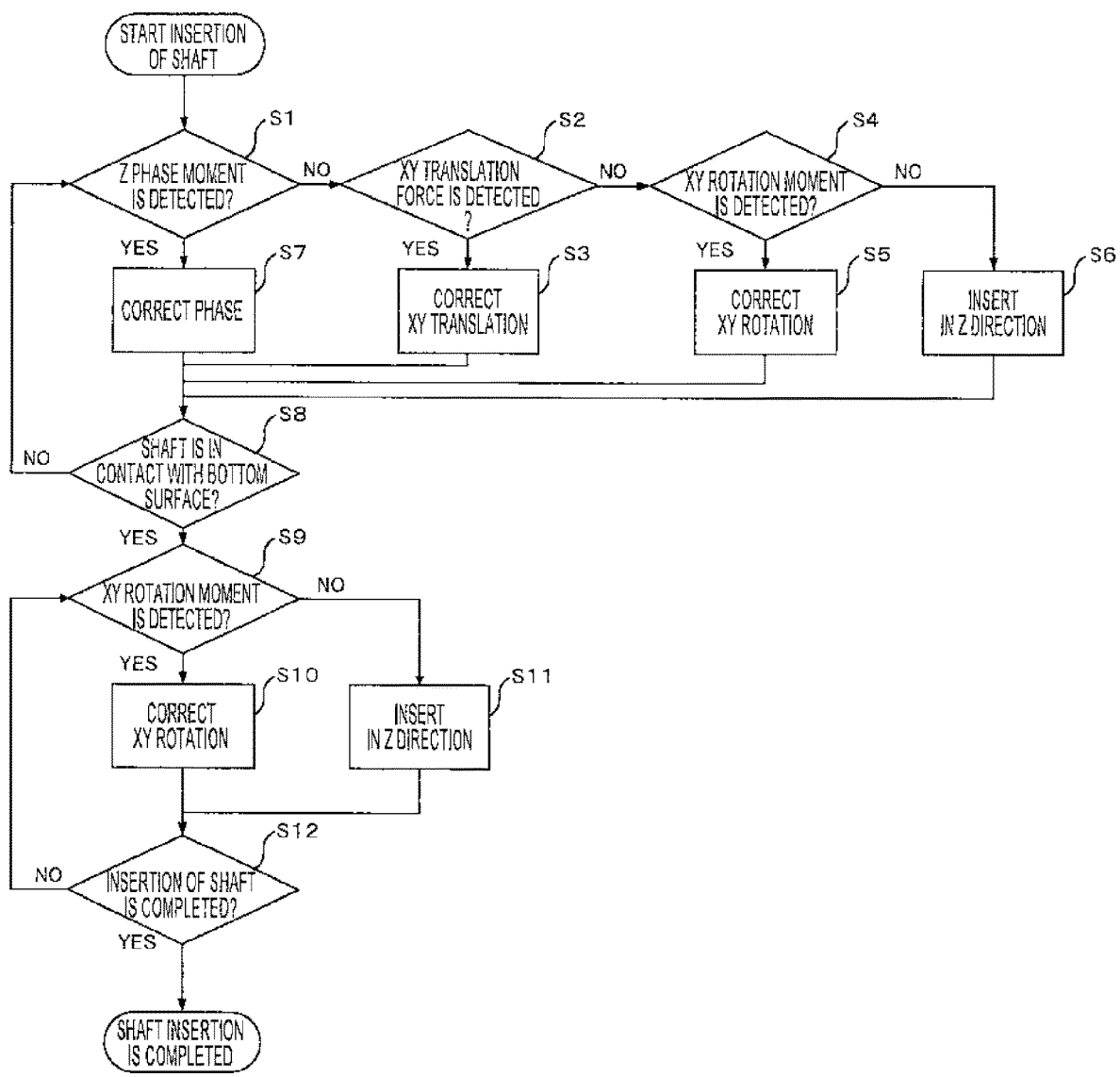
FIG. 25 is a flow chart for illustrating processing of the insertion guide device to which the insertion guide according to the fifth embodiment of the present disclosure is applied.

FIG. 25 is a flow chart for illustrating processing of the insertion guide device to which the insertion guide according to the fourth embodiment of the present disclosure is applied. An operation object of this flow chart is the robot controller 2006. The robot controller 2006 includes a CPU and a storage device, and the following processing is performed with use of the CPU and the storage device. The storage device stores, for example, values of signals from external sensors, internal parameters, variables for numerical calculation processes, and external output parameters, and the CPU uses those data pieces to perform calculation processing.

In FIG. 25, the robot controller 2006 determines whether or not a Z phase moment is detected (Step S1).

When it is determined in Step S1 that the Z phase moment is not detected (that is, NO), the robot controller 2006 determines whether or not the XY translation force is detected (Step S2).

When it is determined in Step S2 that the XY translation force is detected (that is, YES), the robot controller 2006 performs the translation correction in the XY direction (Step S3).

In the states illustrated in FIG. 6 and FIG. 7, the Z phase moment is not detected, but the XY translation force is detected. Thus, the translation correction in the XY direction is performed. The translation correction is performed by movement of the robot so as to reduce X and Y components of the 6-axis output force of the 6-axis force sensor 1001.

Meanwhile, when it is determined in Step S2 that the XY translation force is not detected (that is, NO), the robot controller 2006 determines whether or not an XY rotation moment is detected (Step S4).

When it is determined in Step S4 that the XY rotation moment is detected (that is, YES), the robot controller 2006 performs XY rotation correction (Step S5).

In the states illustrated in FIG. 8 and FIG. 9, the Z phase moment and the XY translation force are not detected, but the XY rotation moment is detected. Thus, the XY rotation correction is performed. The XY rotation correction is performed by movement of the robot so as to reduce the rotation moments TX and TY around X and Y axes.

Meanwhile, when it is determined in Step S4 that the XY rotation moment is not detected (that is, NO), the robot controller 2006 inserts the shaft 10 in the Z-axis direction (Step S6).

Meanwhile, when it is determined in Step S1 that the Z phase moment is detected (that is, YES), the robot controller 2006 performs the phase correction (Step S7).

In FIG. 10, the Z phase moment is detected. Thus, the phase correction is performed. The phase correction is performed by movement of the robot so as to reduce a rotation moment TZ around the Z axis.

Next, the robot controller 2006 determines whether or not the shaft 10 is brought into contact with the hole bottom surface 32 (Step S8).

When it is determined in Step S8 that the shaft 10 is not brought into contact with the hole bottom surface 32 (that is, NO), the processing shifts to Step S1.

Meanwhile, when it is determined in Step S8 that the shaft 10 is brought into contact with the hole bottom surface 32 (that is, YES), the robot controller 2006 determines whether or not the XY rotation moment is detected (Step S9).

When it is determined in Step S9 that the XY rotation moment is detected (that is, YES), the robot controller 2006 performs the XY rotation correction (Step S10).

In FIG. 12, the XY rotation moment is detected under the state in which the shaft 10 is in contact with the hole bottom surface 32. Thus, the XY rotation correction is performed. The XY rotation correction is performed by the movement of the robot so as to reduce the rotation moments TX and TY around the X and Y axes.

When it is determined in Step S9 that the XY rotation moment is not detected (that is, NO), the robot controller 2006 inserts the shaft 10 in the Z-axis direction (Step S11).

Next, the robot controller 2006 determines whether or not the insertion of the shaft 10 is completed (Step S12).

When it is determined in Step S12 that the insertion of the shaft 10 is not completed (that is, NO), the processing shifts to Step S9.

Meanwhile, when it is determined in Step S12 that the insertion of the shaft 10 is completed (that is, YES), the processing of FIG. 25 is terminated.

In Step S8 in FIG. 25, the determination of whether or not the shaft 10 is in contact with the hole bottom surface 32 can be made based on the fact that the translation force in the Z direction detected by the force detector 1000 becomes larger than the force generated during insertion of the shaft 10 into the hole 30. A sensor configured to detect contact or a sensor configured to measure the amount of insertion may be used, or a unit configured to record the amount of insertion may be provided to the robot.

In Step S12 in FIG. 25, the determination of whether or not the insertion of the shaft 10 is completed may be made with use of a sensor configured to detect completion of insertion or a sensor configured to measure the amount of insertion, or based on the amount of insertion recorded by a unit, provided to the robot, configured to record the amount of insertion.

With this, through use of the robot 2000 having the above-mentioned configuration, the shaft 10 can be automatically inserted into the hole 30 formed in the structure.

Figure 26:
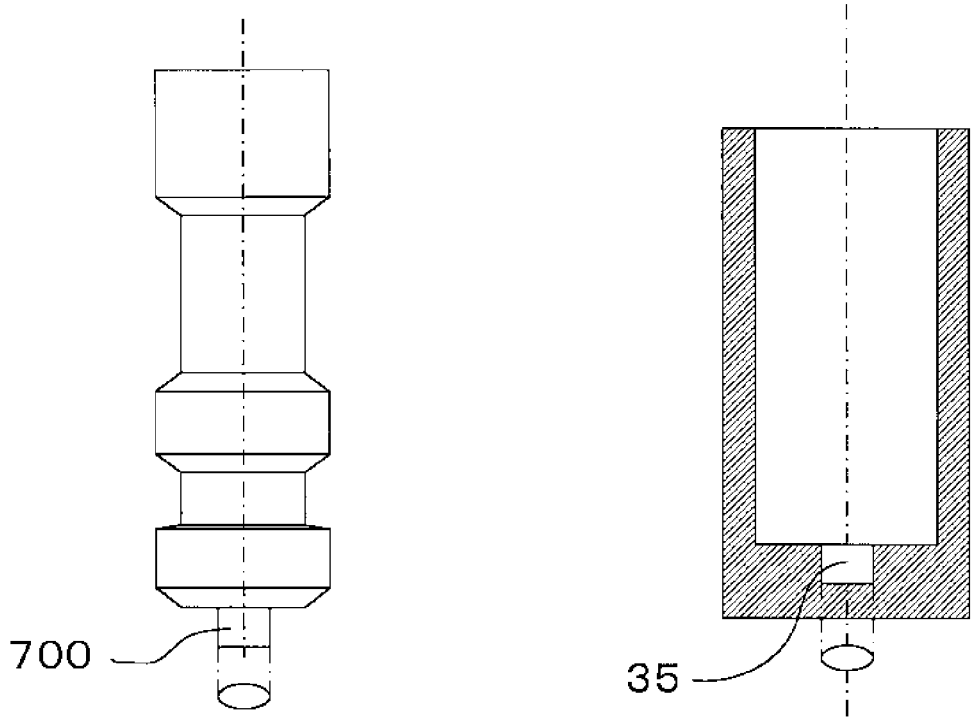
FIG. 26 is another configuration view for illustrating the shaft and the hole of the insertion guide according to the first to fifth embodiments of the present disclosure.
Figure 27:
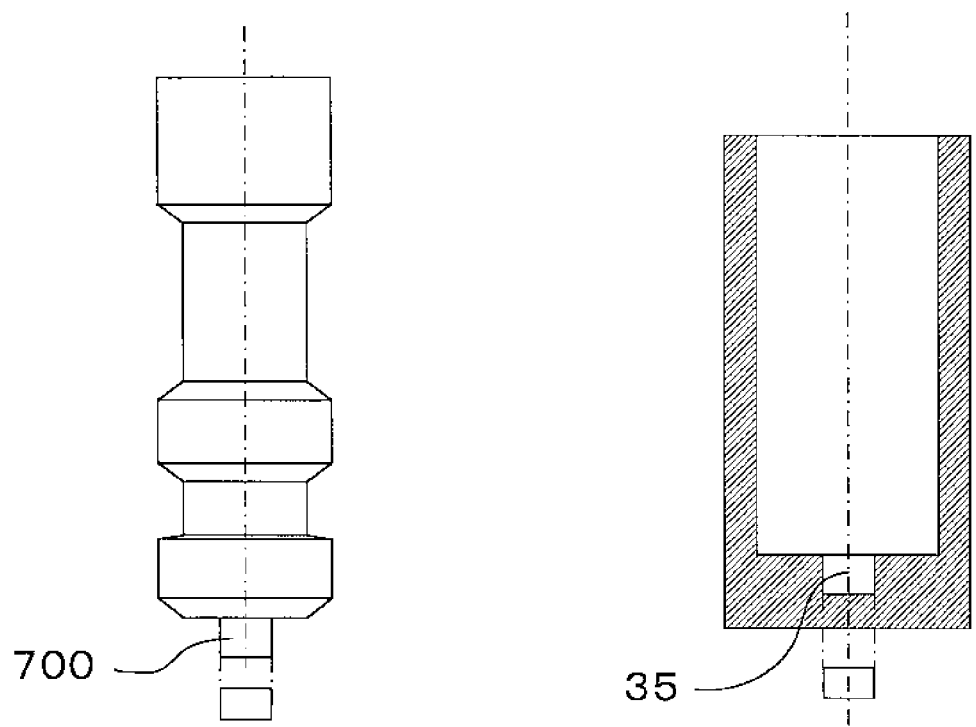
FIG. 27 is still another configuration view for illustrating the shaft and the hole of the insertion guide according to the first to fifth embodiments of the present disclosure.

In the first to fifth embodiment described above, description is made of the case in which the phase guide protruding portion 31 of the hole 30 has a pin shape, and in which the phase guide recessed portion 500 has the tapered part 501 and the engagement part 502. However, the present disclosure is not limited to this. As illustrated in FIG. 26 and FIG. 27, the phase correction may be performed with a shaft distal end phase guide protruding portion 700 and a hole bottom surface phase guide recessed portion 35 each having an oval shape or a polygonal shape.

In the first to fifth embodiments, description is made of the case in which the shaft 10 is to be controlled. However, the present disclosure is not limited to this. The hole 30 may be controlled.

REFERENCE SIGNS LIST

10 shaft, 30 hole, 33 hole translation guide, 34 wide cylindrical portion, 100 first guide portion, 200 first narrow cylindrical portion, 300 second guide portion, 400 second narrow cylindrical portion, 600 fourth guide portion, 1000 force detector, 1002 force measurement logger, 1003 force measurement monitor, 2000 robot, 2006 robot controller

The invention claimed is:

1. A combination of a shaft, a hole and an insertion guide to be used at a time of inserting the shaft into the hole, wherein at least one of the shaft and hole is supported for relative movement with respect to the other of the shaft and hole under the control of a controller, the insertion guide including:
- a first guide portion, provided at a distal end of the shaft to be inserted into the hole, and having a diameter smaller than a diameter of the hole and a shape being in contact with the hole at one point or less;
- a first narrow cylindrical portion, provided on a base end side of the first guide portion, and having a diameter smaller than the diameter of the first guide portion;
- a third guide portion, provided at the distal end of the shaft, and being a recessed portion to be engaged with a protruding portion formed in the hole to determine a phase of rotation around an axis of the shaft;
- a second guide portion, provided on a base end side of the first narrow cylindrical portion, having a diameter smaller than the diameter of the hole and larger than the diameter of the first narrow cylindrical portion and a shape being in contact with the hole at one point or less, wherein the diameter and a length of the second guide portion are configured, when the controller controls the relative movement such that the second guide portion is inserted into the hole and the third guide portion is in contact with the protruding portion, to cause inclination of the shaft with respect to the hole, the inclination being equal to or less than a minimum angle error, the minimum angle error being an angle at which the phase can be corrected without correcting the inclination of the shaft with respect to the hole; and
- a second narrow cylindrical portion, provided on a base end side of the second guide portion, and having a diameter smaller than the diameter of the second guide portion, the diameter and a length of the second narrow cylindrical portion being configured to cause the shaft to be in contact with the hole at two points or less, under a state in which the controller controls the relative movement such that the second guide portion is inserted into the hole and the third guide portion is in contact with the protruding portion.

2. The combination according to claim 1, wherein shapes of the first guide portion and the first narrow cylindrical portion are configured to cause the first guide portion to be inserted into the hole, while inclination of the shaft with respect to the hole is equal to or less than a maximum rotation error.

3. The combination according to claim 1,
wherein the shaft further includes a fourth guide portion, provided on a base end side of the second narrow cylindrical portion, having a diameter smaller than the diameter of the hole and larger than the diameter of the second narrow cylindrical portion, and being configured to reduce inclination of the shaft with respect to the hole through being in contact with the hole, and
wherein the fourth guide portion is formed so as to be brought into contact with the hole before the protruding portion is brought into contact with a bottom surface of the third guide portion.

4. The combination according to claim 1, wherein one of the first guide portion, the second guide portion, and the third guide portion has one of a tapered shape and a shape having a curvature at a distal end side thereof.

5. The combination according to claim 1, further comprising a hole translation guide incorporated in the hole and having one of a tapered shape and a shape having a curvature.

6. The combination according to claim 1, further comprising a force detector configured to detect a rotation moment applied to the shaft
wherein, a length of the first narrow cylindrical portion is configured to cause, under a state in which each of the first guide portion and the second guide portion is in contact with the hole at one point, the rotation moment to be larger than a detection resolution of the force detector.

7. The combination according to claim 1, wherein the diameter of the second narrow cylindrical portion is determined so as to maintain a state in which each of the first guide portion and the second guide portion is in contact with the hole at one point or less, and the third guide portion is in contact with the protruding portion at one point or less while the phase is corrected.

8. The combination according to claim 1, wherein dimensions of the first guide portion, the first narrow cylindrical portion, the second guide portion, the second narrow cylindrical portion, and the third guide portion are designed so as to satisfy expressions of:

$$30D > 100H \times \sin(\Delta REXY \max) + 100D \times \cos(\Delta REXY \max)$$

$$TXY1 = \vec{LA} \times \vec{FA} + \vec{LE} \times \vec{FE} = TXY1A - TXY1E > 1000RES$$

$$30H - 31H/\cos \Delta REXY \min > 100H + 200H + 300H$$

$$\arctan((100D - 400D)/2/\{(30H - 32H)/\cos(\Delta REXY \min) - 100H - 200H - 300H\}) > \Delta REXY \min$$

where:
30D represents an inner diameter of the hole;
30H represents a depth of the hole;
31H represents a distance between an upper end of the protruding portion and a bottom surface of the hole;
32H represents a distance between a lower end of the protruding portion and the bottom surface of the hole;
100H represents a height of the first guide portion;
100D represents a maximum diameter of the first guide portion;
200H represents a height of the first narrow cylindrical portion;
300H represents a height of the second guide portion;
400D represents a maximum diameter of the second narrow cylindrical portion;
TXY1 represents a rotation moment caused by a force FA generated at a first contact point between the first guide portion and the hole and a force FB generated at a second contact point between the second guide portion and the hole;
the vector LA represents a vector from a force detector configured to detect a rotation moment applied to the shaft to the first contact point;
the vector LB represents a vector from the force detector to the second contact point;
1000RES represents a detection resolution of the force detector;
ΔREXYmax represents a maximum value of a rotation error between the shaft and the hole; and
ΔREXYmin represents a rotation error which remains after rotation correction of the second guide portion.

9. The combination according to claim 8,
wherein the shaft further includes a fourth guide portion, provided on a base end side of the second narrow cylindrical portion, having a diameter smaller than the diameter of the hole and larger than the diameter of the second narrow cylindrical portion, and is configured to reduce inclination of the shaft with respect to the hole through being in contact with the hole, wherein the fourth guide portion is formed so as to be brought into contact with the hole before the protruding portion is brought into contact with the bottom surface of the third guide portion, and wherein dimensions of the first guide portion, the first narrow cylindrical portion, the second guide portion, the second narrow cylindrical portion, the third guide portion, and the fourth guide portion are designed so as to further satisfy expressions of:

$$30H-31H/\cos(\Delta REXY\ min) > 100H+200H+300H+400H-500H$$

$$(30H/\cos(\Delta REXY\ min) > 100H+200H+300H+400H$$

$$\Delta REXY\ min = \arctan(30D-100D \times \cos \Delta REXY\ min/30H)$$

where:

400H represents a height of the second narrow cylindrical portion; and 500H represents a depth of the third guide portion.

10. A combination of a shaft, a hole and an insertion guide device, wherein at least one of the shaft and hole is supported for relative movement with respect to the other of the shaft and hole under the control of a controller, the insertion guide device comprising:

a first guide portion, provided at a distal end of the shaft to be inserted into the hole, and having a diameter smaller than a diameter of the hole and a shape being in contact with the hole at one point or less;

a first narrow cylindrical portion, provided on a base end side of the first guide portion, and having a diameter smaller than the diameter of the first guide portion;

a third guide portion, provided at the distal end of the shaft, and being a recessed portion to be engaged with a protruding portion formed in the hole to determine a phase being rotation around an axis of the shaft;

a second guide portion, provided on a base end side of the first narrow cylindrical portion, and having a diameter smaller than the diameter of the hole and larger than the diameter of the first narrow cylindrical portion and a shape being in contact with the hole at one point or less, wherein the diameter and a length of the second guide portion are configured, when the controller controls the relative movement such that the second guide portion is inserted into the hole and the third guide portion is in contact with the protruding portion, to cause inclination of the shaft with respect to the hole and the third guide portion to be contact with the protruding portion, the inclination being equal to or less than a minimum angle error, the minimum angle error being an angle at which the phase can be corrected without correcting the inclination of the shaft with respect to the hole; and a second narrow cylindrical portion, provided on a base end side of the second guide portion, and having a diameter smaller than the diameter of the second guide portion, the diameter and a length of the second narrow cylindrical portion being configured to cause the shaft to be in contact with the hole at two points or less, under a state in which the controller controls the relative movement such that the second guide portion is inserted into the hole and the third guide portion is in contact with the protruding portion;

a force sensor provided on the base end side of the second guide portion;

a force measurement logger connected to the force sensor; and a force measurement monitor connected to the force measurement logger.

11. A combination of a shaft and a hole, and an insertion guide device, the insertion guide device including:

a first guide portion, provided at a distal end of the shaft to be inserted into the hole, and having a diameter smaller than a diameter of the hole and a shape being in contact with the hole at one point or less;

a first narrow cylindrical portion, provided on a base end side of the first guide portion, and having a diameter smaller than the diameter of the first guide portion;

a third guide portion, provided at the distal end of the shaft, and being a recessed portion to be engaged with a protruding portion formed in the hole to determine a phase being rotation around an axis of the shaft; and a second guide portion, provided on a base end side of the first narrow cylindrical portion, and having a diameter smaller than the diameter of the hole and larger than the diameter of the first narrow cylindrical portion and a shape being in contact with the hole at one point or less, the diameter and a length of the second guide portion being configured to cause inclination of the shaft with respect to the hole, under a state in which the second guide portion is inserted into the hole and the third guide portion is in contact with the protruding portion, to be equal to or less than a minimum angle error, the minimum angle error being an angle at which the phase can be corrected without correcting the inclination of the shaft with respect to the hole; and a second narrow cylindrical portion, provided on a base end side of the second guide portion, and having a diameter smaller than the diameter of the second guide portion, the diameter and a length of the second narrow cylindrical portion being configured to cause the shaft to be in contact with the hole at two points or less, under a state in which the second guide portion is inserted into the hole and the third guide portion is in contact with the protruding portion;

a force sensor provided on a base end side of the second guide portion; and a robot controller to control a robot, configured to operate the shaft, through feedback of an output from the force sensor to insert the shaft into the hole, wherein, when the first guide portion is in contact with the hole, the robot controller controls the robot so as to reduce a translation force in a plane perpendicular to a shaft axial direction, wherein, when each of the first guide portion and the second guide portion is in contact with the hole, the robot controller controls the robot so as to reduce rotation moments around two axes forming the plane perpendicular to the shaft axial direction, wherein, when the third guide portion is in contact with the protruding portion, the robot controller controls the robot so as to reduce a rotation moment around the shaft axial direction, and wherein, when a distal end of the shaft is in contact with a bottom surface of the hole, the robot controller controls the robot so as to reduce rotational moments around two axes forming the plane perpendicular to the shaft axial direction.

12. A combination of a shaft and a hole, and an insertion guide to be used at a time of inserting the shaft into the hole, the insertion guide including:

a third guide portion, provided at the distal end of the shaft, and being a recessed portion to be engaged with a protruding portion formed in the hole to determine a phase being rotation around an axis of the shaft;

a wide cylindrical portion, provided at a part of a side surface of the hole, and having a diameter larger than the diameter of the hole;

a first guide portion, provided at a distal end of the shaft to be inserted into the hole, having a diameter smaller than a diameter of the hole and a shape being in contact with the hole at one point or less, wherein the diameter and a length of a second guide portion are configured, when the controller controls the relative movement such that the second guide portion is inserted into the hole and the third guide portion is in contact with the protruding portion, to cause inclination of the shaft with respect to the hole, the inclination being equal to or less than a minimum angle error, the minimum angle error being an angle at which the phase can be corrected without correcting the inclination of the shaft with respect to the hole; and a second narrow cylindrical portion, provided on a base end side of the first guide portion, and having a diameter smaller than the diameter of the first guide portion, the diameter and a length of the second narrow cylindrical portion being configured to cause the shaft to be in contact with the hole at two points or less, under a state in which the controller controls the relative movement such that the first guide portion is inserted into the hole and the third guide portion is in contact with the protruding portion.

13. The combination according to claim 12, wherein the diameter and a length of the wide cylindrical portion being configured to cause the first guide portion to be inserted into the hole and to be in contact with the hole at one point or less while inclination of the shaft with respect to the hole is equal to or less than a maximum rotation error.

14. The combination according to claim 12, further comprising a hole translation guide incorporated in the hole and having a tapered shape.

15. The combination according to claim 12, further comprising a force detector configured to detect a rotation moment applied to the shaft wherein a length of the wide cylindrical portion being configured to cause, under a state in which the first guide portion is in contact with the hole on a bottom surface side with respect to the wide cylindrical portion at one point, and the first guide portion is in contact with the hole on an inlet side with respect to the wide cylindrical portion at one point, the rotation moment to be larger than a detection resolution of the force detector.

16. The combination according to claim 12, wherein the shaft further includes a fourth guide portion, provided on a base end side of the second narrow cylindrical portion, has a diameter smaller than the diameter of the hole and larger than the diameter of the second narrow cylindrical portion, and is configured to reduce inclination of the shaft with respect to the hole through being in contact with the hole, wherein the fourth guide portion is formed so as to be brought into contact with the hole before the protruding portion is brought into contact with the bottom surface of the third guide portion.

\* \* \* \* \*